US011634076B2

United States Patent
Peterson et al.

(10) Patent No.: US 11,634,076 B2
(45) Date of Patent: Apr. 25, 2023

(54) VEHICULAR EXTERIOR MIRROR WITH ACTUATOR

(71) Applicant: Magna Mirrors of America, Inc., Holland, MI (US)

(72) Inventors: Kenneth C. Peterson, Ada, MI (US); Mitchell J. Wesley, Grand Rapids, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

(21) Appl. No.: 17/454,843

(22) Filed: Nov. 15, 2021

(65) Prior Publication Data

US 2022/0073001 A1 Mar. 10, 2022

Related U.S. Application Data

(63) Continuation of application No. 16/639,602, filed as application No. PCT/IB2018/056228 on Aug. 17, 2018, now Pat. No. 11,173,843.

(60) Provisional application No. 62/546,716, filed on Aug. 17, 2017.

(51) Int. Cl.
*B60R 1/074* (2006.01)
(52) U.S. Cl.
CPC ..................... *B60R 1/074* (2013.01)
(58) Field of Classification Search
CPC ................................ B60R 1/072; B60R 1/074
USPC .................................................. 359/841, 877
See application file for complete search history.

(56) References Cited

U.S. PATENT DOCUMENTS

| 6,022,113 | A | 2/2000 | Stolpe et al. |
| 6,130,514 | A * | 10/2000 | Oesterholt ............. B60R 1/074 359/872 |
| 6,133,704 | A | 10/2000 | Yoshida et al. |
| 6,322,221 | B1 | 11/2001 | van de Loo |
| 6,390,630 | B1 | 5/2002 | Ochs |
| 6,578,973 | B2 | 6/2003 | Apfelbeck |
| 6,874,896 | B2 | 4/2005 | Yoshida |

(Continued)

FOREIGN PATENT DOCUMENTS

| CN | 1938179 A | 3/2007 |
| JP | 4199556 B2 | 12/2008 |
| WO | 2005113290 A1 | 12/2005 |

OTHER PUBLICATIONS

International Seach Report and Written Opinion dated Dec. 7, 2018 for corresponding PCT Application No. PCT/IB2018/056228.

*Primary Examiner* — Ricky D Shafer
(74) *Attorney, Agent, or Firm* — Honigman LLP

(57) ABSTRACT

A vehicular exterior rearview mirror assembly includes a mirror head movably attached at a mounting base configured for mounting at a side of a vehicle. The mirror head includes a mirror casing and a mirror reflective element. An actuator is operable to move the mirror head relative to the mounting base between at least an extended position and a folded position. The actuator includes a first detent interface that is engaged to maintain the mirror head at the folded or extended position when the mirror head is moved via the actuator to that position. The actuator includes a second detent interface that is engaged to maintain the mirror head at the folded or extended position when the mirror head is manually moved to that position. The second detent interface is not engaged while the actuator moves the mirror head between the folded position and the extended position.

16 Claims, 24 Drawing Sheets

(56) References Cited

U.S. PATENT DOCUMENTS

| | | |
|---|---|---|
| 6,926,414 B2 | 8/2005 | Van Stiphout |
| 6,981,774 B2 | 1/2006 | Dumont et al. |
| 7,008,068 B2 | 3/2006 | Yoshida |
| 7,070,287 B2 | 7/2006 | Foote et al. |
| 7,171,726 B2 | 2/2007 | Kleissen et al. |
| 7,374,299 B2 | 5/2008 | Brouwer et al. |
| 7,392,567 B2 | 7/2008 | Brouwer |
| 7,452,088 B2 | 11/2008 | Brester et al. |
| 7,490,945 B2 | 2/2009 | Proctor |
| 7,543,949 B2 | 6/2009 | van den Brink et al. |
| 7,547,855 B2 | 6/2009 | Brouwer et al. |
| 7,572,018 B2 | 8/2009 | Errando Smet et al. |
| 7,628,499 B2 | 12/2009 | Brouwer et al. |
| 7,744,229 B2 | 6/2010 | Oehmann et al. |
| 7,836,553 B2 | 11/2010 | Brouwer et al. |
| 7,887,202 B1 | 2/2011 | Peterson |
| 8,129,642 B2 | 3/2012 | Brouwer et al. |
| 8,201,305 B2 | 6/2012 | Brouwer et al. |
| 8,313,202 B2 | 11/2012 | van Stiphout et al. |
| 8,366,284 B2 | 2/2013 | Flynn et al. |
| 8,628,200 B2 | 1/2014 | van Stiphout et al. |
| 8,915,601 B2 | 12/2014 | Foote et al. |
| 9,033,526 B2 | 5/2015 | Schuurmans et al. |
| 9,045,088 B2 * | 6/2015 | Sakata ............... B60R 1/074 |
| 9,067,541 B2 | 6/2015 | Sobecki et al. |
| 9,242,606 B2 | 1/2016 | Mambourg |
| 9,487,142 B2 | 11/2016 | Sobecki et al. |
| 9,758,100 B2 | 9/2017 | Mendoza Vicioso et al. |
| 9,827,913 B2 | 11/2017 | De Wind et al. |
| 9,987,987 B2 | 6/2018 | van Stiphout et al. |
| 10,099,618 B2 | 10/2018 | Foote et al. |
| 10,940,801 B1 | 3/2021 | Harris et al. |
| 11,173,843 B2 | 11/2021 | Peterson et al. |
| 11,214,198 B2 * | 1/2022 | Harris ............... B60R 1/074 |
| 11,396,264 B2 * | 7/2022 | Peterson ............ B60R 1/074 |
| 2002/0135905 A1 | 9/2002 | Yoshida |
| 2003/0218812 A1 | 11/2003 | Foote et al. |
| 2004/0196578 A1 | 10/2004 | Dumont et al. |
| 2004/0218296 A1 | 11/2004 | Van Stiphout |
| 2005/0000058 A1 | 1/2005 | Kleissen et al. |
| 2005/0134979 A1 | 6/2005 | Yoshida |
| 2005/0141111 A1 | 6/2005 | Yoshida |
| 2006/0103957 A1 | 5/2006 | Olijnyk et al. |
| 2006/0274442 A1 | 12/2006 | Brouwer et al. |
| 2007/0035862 A1 * | 2/2007 | Brouwer ............. B60R 1/074 359/841 |
| 2007/0084707 A1 | 4/2007 | van den Brink et al. |
| 2007/0211356 A1 | 9/2007 | Brester et al. |
| 2008/0168623 A1 | 7/2008 | Brouwer et al. |
| 2009/0237820 A1 | 9/2009 | McCabe et al. |
| 2009/0303625 A1 | 12/2009 | van Stiphout et al. |
| 2010/0238570 A1 | 9/2010 | Reedman et al. |
| 2010/0275411 A1 | 11/2010 | Brouwer |
| 2012/0067497 A1 | 3/2012 | Hansel et al. |
| 2013/0321941 A1 | 12/2013 | van Stiphout et al. |
| 2018/0345862 A1 | 12/2018 | van Stiphout |
| 2019/0092241 A1 * | 3/2019 | Fujisaki ............. B60R 1/074 |
| 2021/0261053 A1 | 8/2021 | Peterson et al. |
| 2022/0126751 A1 * | 4/2022 | Steffes ............. B60R 1/074 |
| 2022/0355736 A1 * | 11/2022 | Peterson ........... B60R 1/074 |

* cited by examiner

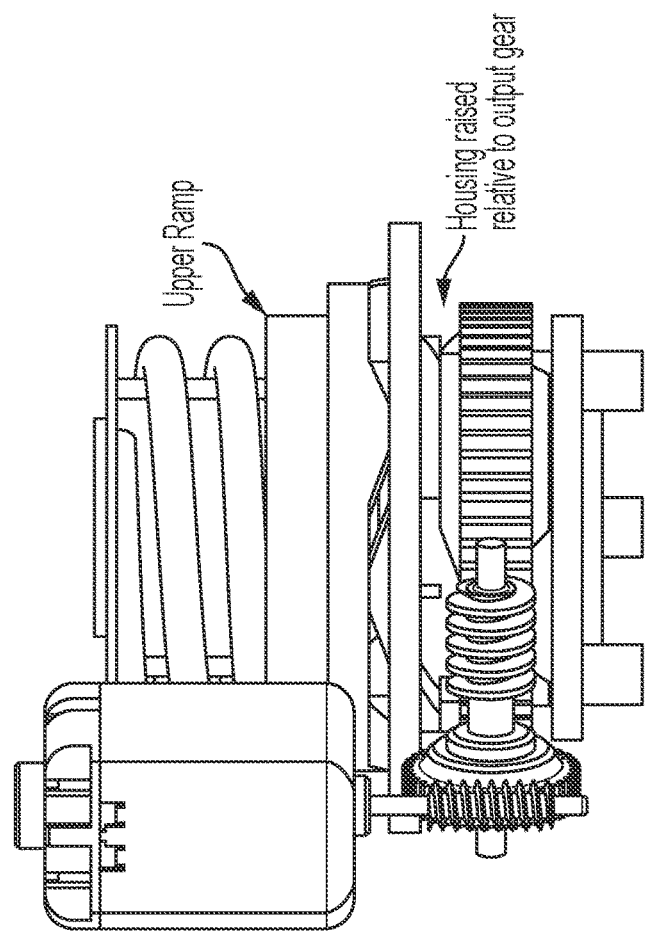
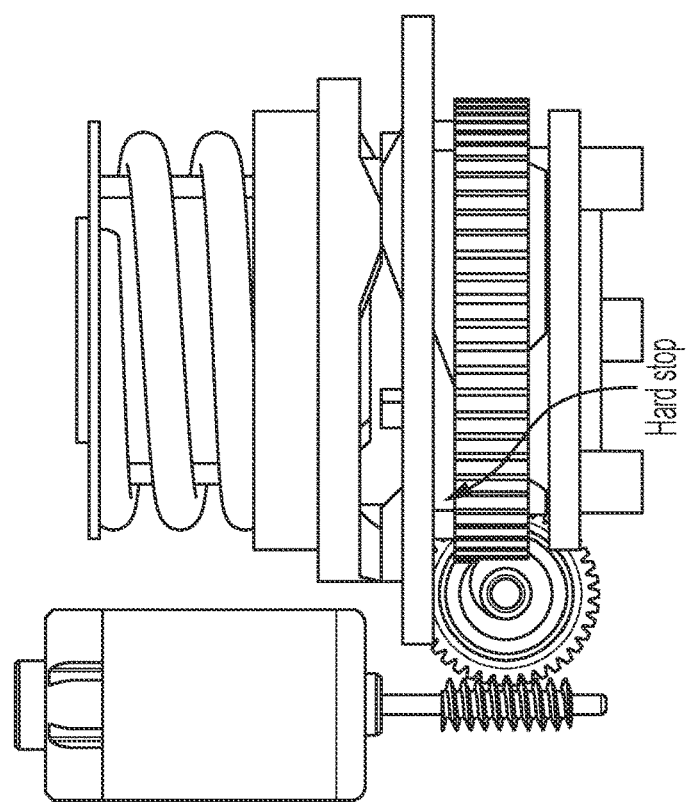

Base post has helical detents for uniform surface contact

VEHICULAR EXTERIOR MIRROR WITH ACTUATOR

CROSS REFERENCE TO RELATED APPLICATIONS

The present application is a continuation of U.S. patent application Ser. No. 16/639,602, filed Aug. 17, 2018, now U.S. Pat. No. 11,173,843, which is a 371 national phase filing of PCT Application No. PCT/IB2018/056228, filed Aug. 17, 2018, which claims the filing benefits of U.S. provisional application Ser. No. 62/546,716, filed Aug. 17, 2017, which is hereby incorporated herein by reference in its entirety.

FIELD OF THE INVENTION

The present invention relates generally to the field of exterior rearview mirror assemblies for vehicles and, more particularly, to the field of powerfold exterior rearview mirror assemblies.

BACKGROUND OF THE INVENTION

It is known to provide an automotive exterior rearview mirror assembly that includes a foldable mirror assembly, such as a powerfold mirror where the mirror head is pivotable via an actuator between a drive or use position and a folded or park position.

SUMMARY OF THE INVENTION

The present invention provides a rearview mirror assembly (such as an exterior mirror assembly mounted at a side of an equipped vehicle) that includes a powerfold actuator system to pivot the mirror head of the mirror assembly between a drive or use position and a folded or park position responsive to a user input. The powerfold actuator includes a primary detent assembly that functions to retain the mirror head at either the folded or drive position, and also includes a separate secondary detent assembly that functions to retain the mirror head at the drive position when the mirror head is manually pivoted from the folded position to the drive position. During operation of the powerfold actuator, the actuator functions to lift the mirror head relative to the mounting base (at the vehicle) so that there are reduced forces and reduced friction at the cut line seal that is disposed between the mirror head and the mounting base. When the mirror head is raised, an upper detent of the powerfold actuator is not raised, such that the raising of the mirror head is achieved without further compressing of a spring to reduce the power required from the motor of the actuator.

These and other objects, advantages, purposes and features of the present invention will become apparent upon review of the following specification in conjunction with the drawings.

BRIEF DESCRIPTION OF THE DRAWINGS

FIG. 7 is a side elevation of the actuator, shown with the mirror head in the drive position;

FIG. 8 is another side elevation of the actuator, shown with the mirror head in the folded position;

DESCRIPTION OF THE PREFERRED EMBODIMENTS

Figure 1:
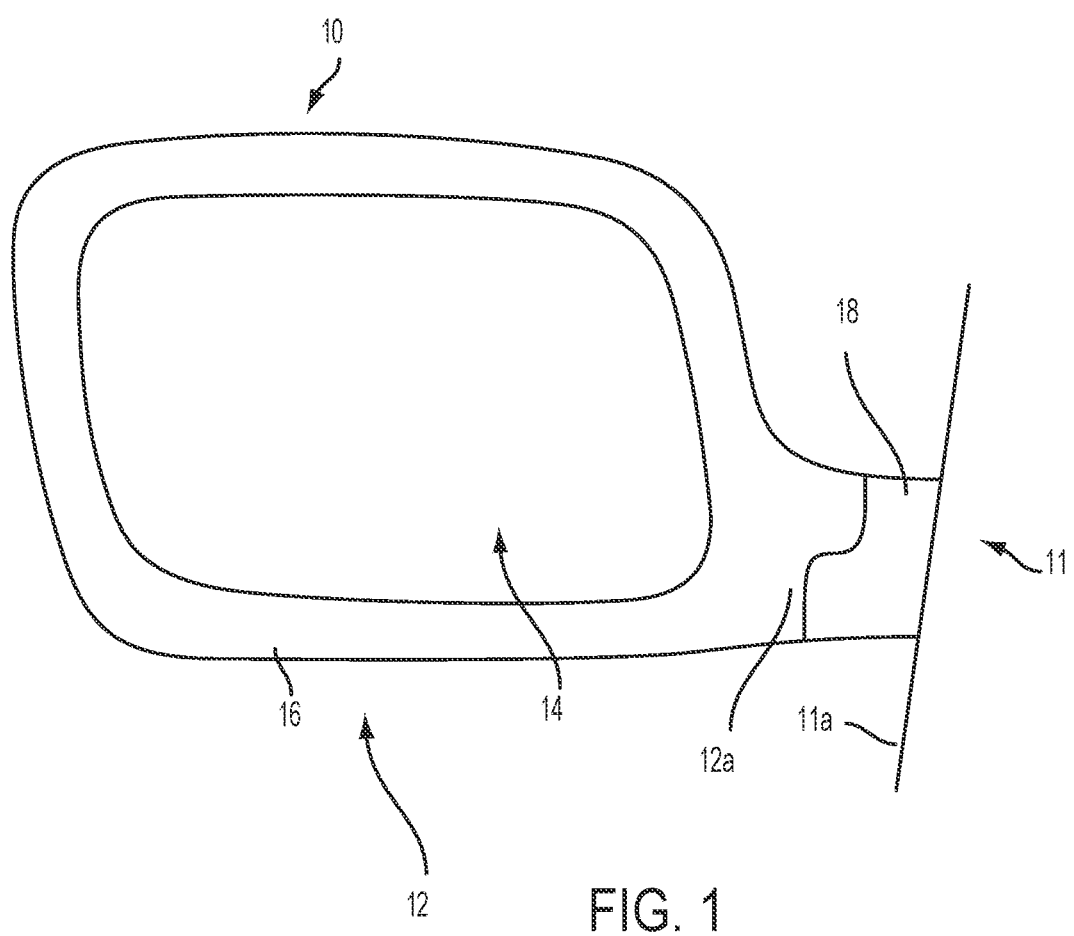
FIG. 1 is a perspective view of an exterior rearview mirror assembly in accordance with the present invention.

Referring now to the drawings and the illustrative embodiments depicted therein, an exterior rearview mirror assembly 10 for a vehicle 11 includes a mirror head 12 that includes a mirror reflective element 14 received in and/or supported at or by a mirror shell or casing 16 of the mirror head portion 12 (FIG. 1). The mirror head portion 12 includes a mounting portion 12a that is pivotally or movably mounted to a mounting arm or base or portion 18. The mirror assembly 10 comprises a powerfold mirror (where the mirror head portion may be pivoted via an actuator assembly or adjustment device), and may comprise a breakaway mirror (where the mirror head portion may be manually pivoted about the mounting arm or base). The mounting arm or base 18 of mirror assembly 10 is mounted at the side 11a of a host or subject vehicle 11, with the reflective element 14 providing a rearward field of view along the respective side of the vehicle to the driver of the vehicle, as discussed below.

Figure 3:
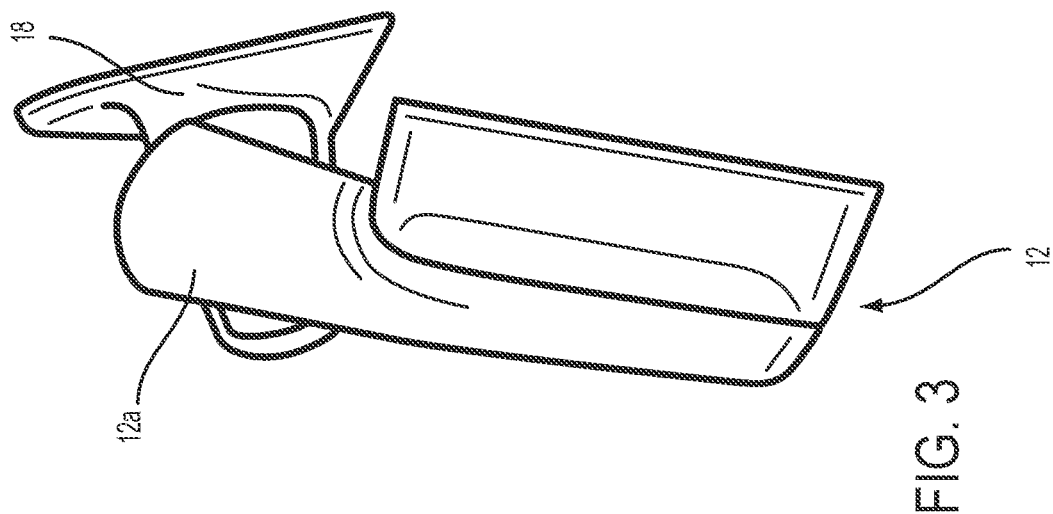
FIG. 3 is a top plan view of the exterior mirror assembly, with the mirror head pivoted to a folded or non-use position.
Figure 2:
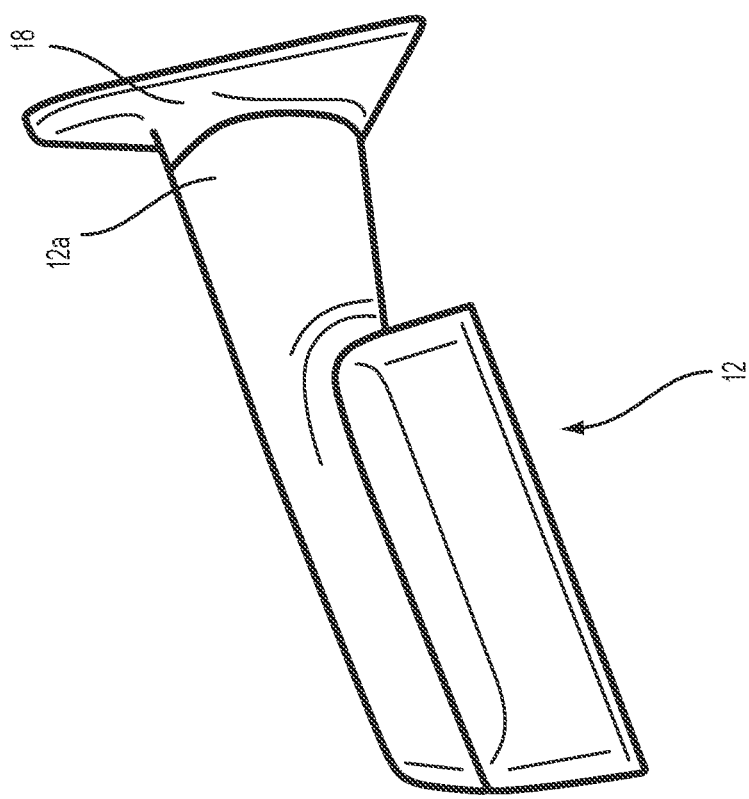
FIG. 2 is a top plan view of the exterior mirror assembly, with the mirror head pivoted to an drive or use position.

The mirror assembly comprises a powerfold mirror assembly that includes an actuator 20 that is operable to pivot the mirror head 12 (comprising the mirror casing 16 and reflective element 14) relative to the mounting arm or base 18. The actuator operates, responsive to a user input, to pivot the mirror head 12 between a plurality of detent positions, including a user or drive position (FIG. 2) and a folded or park position (FIG. 3). The mirror head is also pivotable manually to either the use or folded position. Optionally, the mirror head may also be pivoted to a fully forward position. A seal may be disposed along the interface between the mounting portion 12*a* of the mirror head 12 and the mounting arm or base 18. The actuator may utilize aspects of the actuators described in U.S. Pat. Nos. 7,887, 202 and 9,487,142, which are hereby incorporated herein by reference in their entireties.

Figure 4:
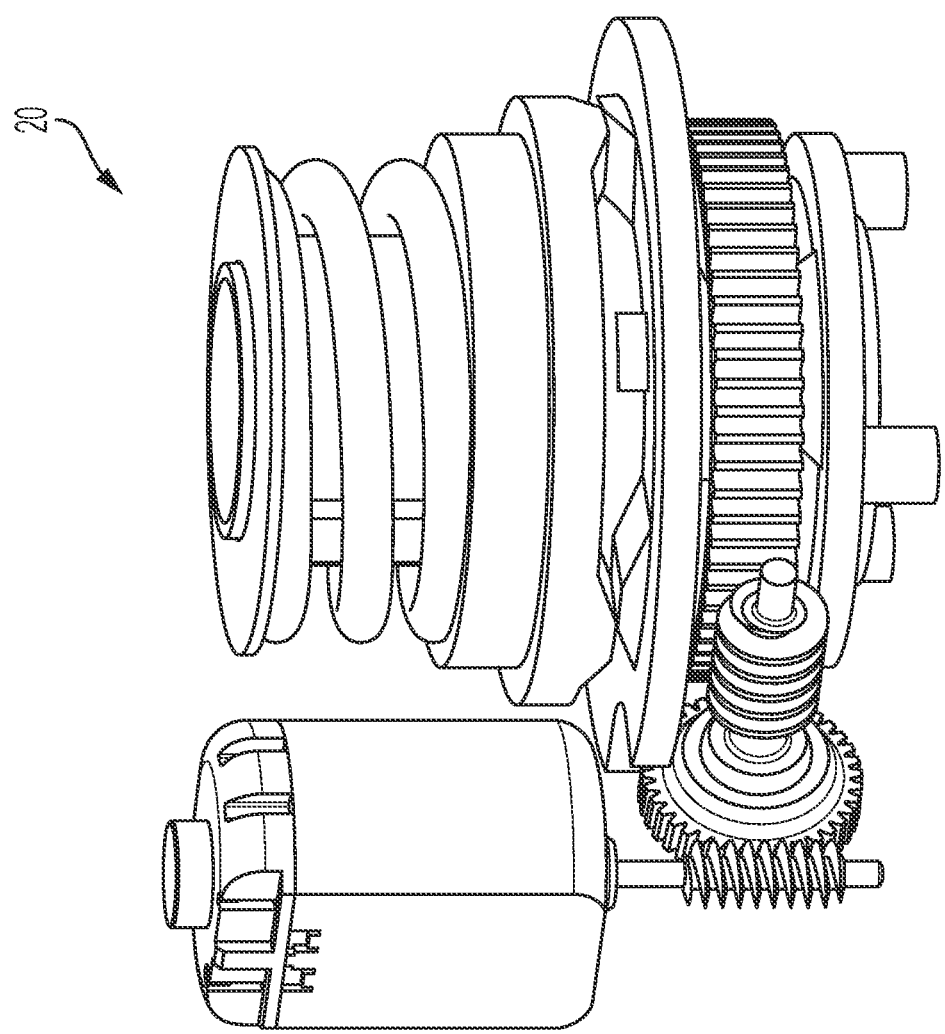
FIG. 4 is a perspective view of an actuator of the exterior mirror assembly of FIGS. 1-3.
Figure 5:
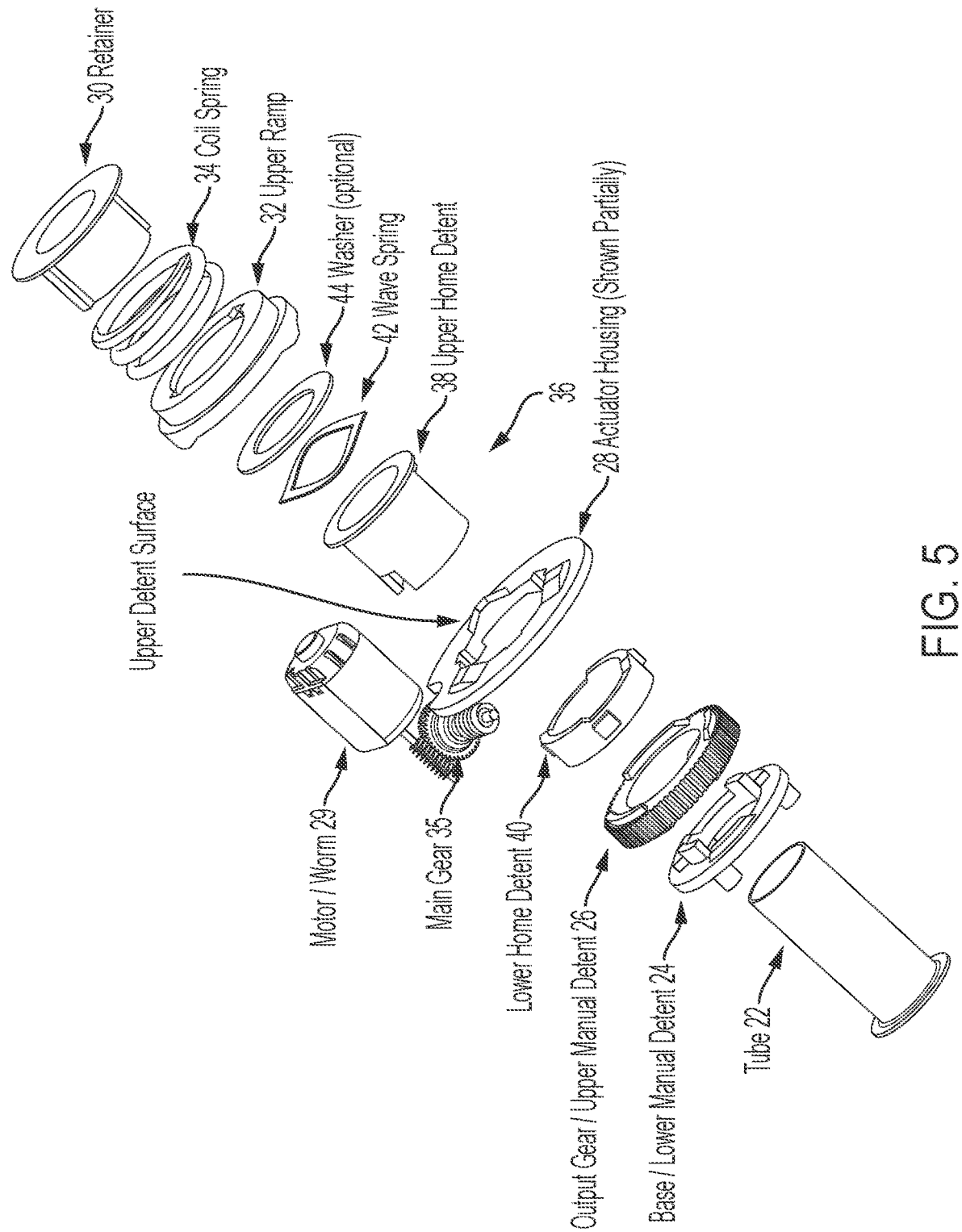
FIG. 5 is an exploded perspective view of the actuator.
Figure 6:
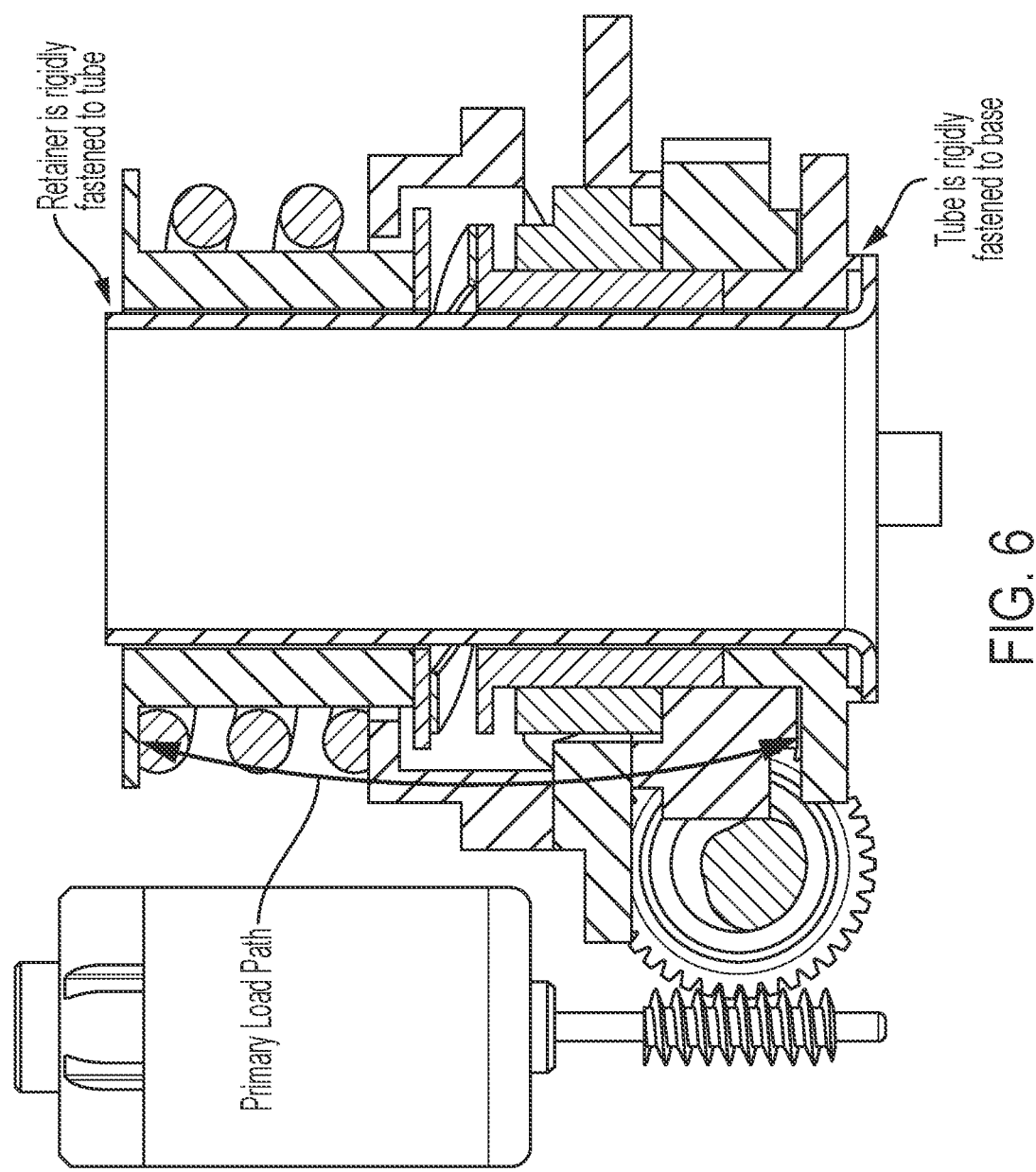
FIG. 6 is a sectional view of the actuator.

As shown in FIGS. 4 and 5, the mirror actuator 20 comprises a pivot assembly that has a tube 22 that provides or defines a pivot axis for the mirror head. A base or lower manual detent 24 and output gear or upper manual detent 26 are disposed at the bottom of the tube and are fixedly disposed at or attached at the mounting base 18. An actuator housing or bracket 28 is rotatably disposed at the tube and houses a motor 29 and is non-rotatably disposed or attached at the mirror head 12. The tube 22 extends through the base 24, output gear 26 and housing 28 and has a retainer 30 affixed at its upper end. As shown in FIG. 6, the retainer 30 is rigidly fastened to the tube 22 and the base 24 is rigidly fastened to the tube 22, such that the retainer, tube and base are effectively a single member or element and provide axial and rotational ground reference for all motions and forces.

The pivot assembly provides detents to retain the mirror head at the use position or at the folded position. The output gear 26 and a lower surface or portion of the housing 28 are configured to engage one another to retain the mirror head at the drive position (see FIG. 7), while an upper surface or portion of the housing 28 and an upper ramp element 32 are configured to engage one another to retain the mirror head at the folded position (see FIG. 8). A coil spring or other suitable biasing or urging element 34 provides the primary load and exerts a downward force at the upper ramp element 32, which engages the housing 28, which engages the output gear 26, which engages the base 24. The retainer 30 is non-rotatably keyed to the upper ramp element 32. Thus, during operation of the actuator, the actuator bracket or housing 28 (and the motor 29 and mirror head) rotate about the pivot axis (or longitudinal axis of the tube), while the output gear 26 and upper ramp element 32 (and tube 22 and retainer 30) remain fixed relative to the mounting base 24.

With reference to FIG. 7, when the mirror head is in the drive position (FIG. 2), the lower housing detent is engaged with the output gear detent to retain the mirror head in that position. The detents are configured such that there is a hard stop opposite the ramped surfaces to locate the mirror head at the drive position. Thus, when pivoting the mirror head to the drive position, the motor 29 will rotate main gear 35. The main gear 35 is engaged with output gear 26 and will rotate the housing relative to the output gear until the hard stop is engaged, whereby the motor will stall or stop, with the mirror head retained at the extended or drive position.

With reference to FIG. 8, when the mirror head is pivoted to the folded position (FIG. 3), the upper ramp detent is engaged with the upper housing detent to retain the mirror head in that position. In that position, the lower housing detent is movably engaged (i.e., not at a detent position) with an upper portion or surface of the output gear.

The ramped surfaces of the upper ramp detent, the upper housing detent, the lower housing detent and the output gear detent are configured such that, as the lower housing detent ramped surface slides along the output gear detent ramped surface, the upper housing detent ramped surface also slides along the upper ramp detent ramped surface. Thus, as the housing is raised (as it is rotated toward the folded position and moves along the upper ramped surfaces of the output gear) relative to the base, the upper ramp detent moves along the upper ramped surfaces of the housing (and remains at generally the same level while the housing is raised), such that the coil spring does not compress as the mirror head is pivoted. The upper ramp detent thus provides force at the housing (via the coil spring), while allowing the housing to lift while rotating without compressing the coil spring, thus minimizing work for the actuator motor. The upper ramp detent is prevented from turning relative to the tube via a spline connection with the retainer.

As the housing and mirror head are rotated toward the folded position, the housing 28 lifts in relation to the output gear 26 while turning, and such lifting lifts the mirror head and increases the gap between the mirror head mounting portion and the mounting base 24 and thus reduces or limits or avoids pressure at the cut line seal (the seal that is disposed between and at the interface of the mirror head mounting portion 12*a* and the mounting base 18 and that follows the contour and fills the gap between the mirror head and the base) during pivotal movement of the mirror head.

Figure 9:
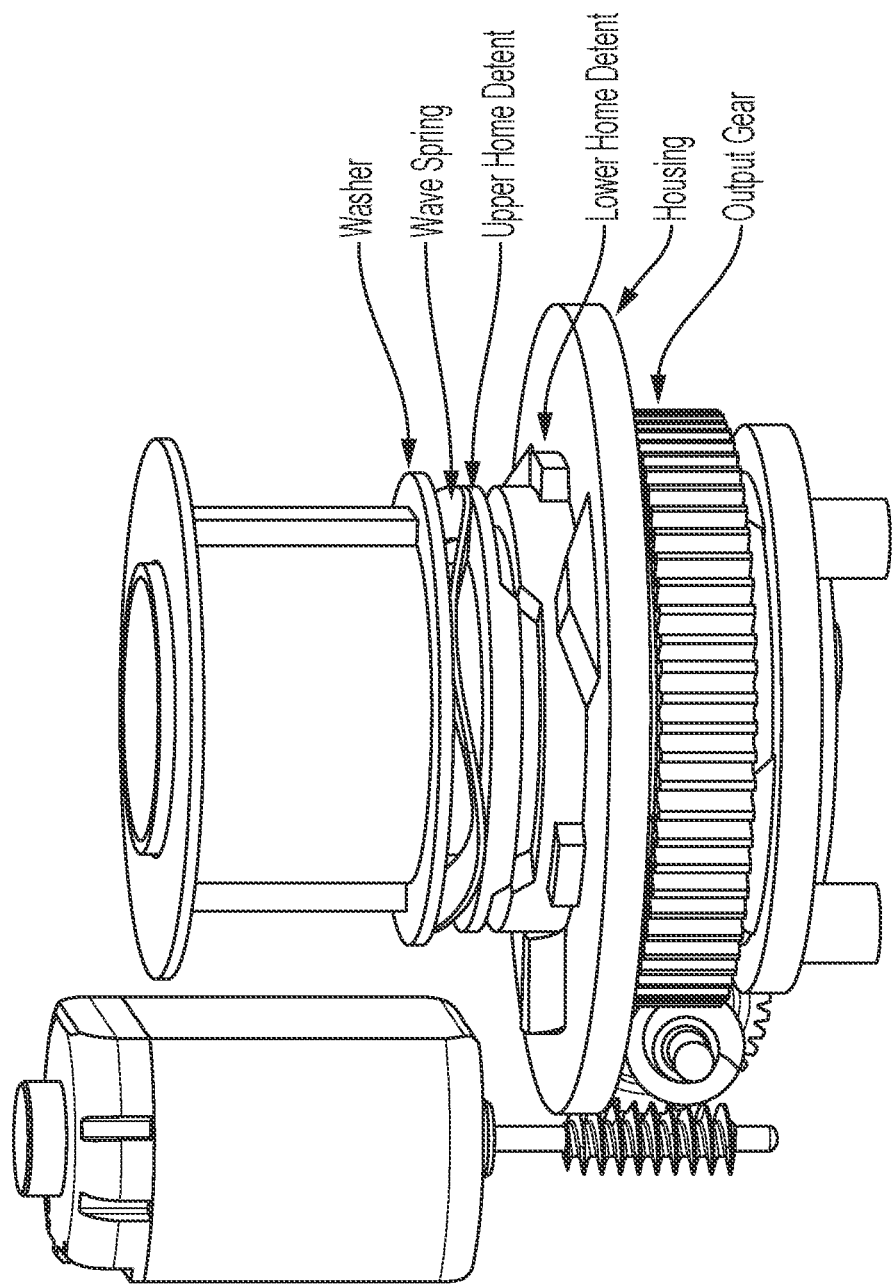
FIG. 9 is a perspective view of the actuator, with the upper detent element removed to show additional details.

The actuator and pivot assembly also includes a secondary detent assembly or device 36 that provides detents for when the mirror head is manually pivoted between the drive and folded positions. In the illustrated embodiment, and as best shown in FIGS. 5 and 9 (with FIG. 9 having the upper ramp detent removed), the secondary detent components include an upper home detent 38 and a lower home detent 40 that are disposed at the tube 22 and received through the housing 28 and output gear 26. A wave spring or other suitable biasing or urging element 42 is disposed at the bottom of the retainer 30 (with an optional washer 44) and provides force at the secondary (home) detent. The upper home detent 38 is rotationally keyed to the base 24 and is urged (via the wave spring) toward the base so as to be bottomed out at the base (when the lower detents of the output gear are engaged with the detents of the base, such as shown in FIGS. 7 and 8), thus preventing engagement with the lower home detent 40 when the mirror head and housing are in the normal drive position or the normal folded position.

The lower home detent 40 rests on the output gear 26 and is rotationally keyed to the housing 28. During normal power fold operation (when the motor 29 is actuated in either direction), the lower home detent 40 rotates with the housing 28 but remains disengaged with the upper home detent 38 since the output gear 26 is in the lower position (engaged with the detents of the base). If the output gear 26 is disengaged from the base (such as via manual folding or pivoting), the output gear moves up the ramped detent surfaces of the base 24 and raises the housing 28 and the lower home detent 40. The lower home detent thus is raised up and forced into engagement with the upper home detent 38. When the mirror head is manually pivoted to the drive position, the detent surfaces of the upper and lower home detents engage to retain the mirror head at the drive position. The secondary detent device 36 is therefore engaged and provides holding torque whenever the primary detent is disengaged and the mirror head is in the drive (home) position.

The retainer is fixed and the wave spring pushes down on upper home detent, which is keyed to the base and bottoms out at the base. Thus, when the output gear is down and engaged with the base, the secondary or home detents do not and cannot engage. When the output gear is raised (via manual pivoting of the mirror head), the upper and lower home detents engage when the mirror head is pivoted to the drive position (and not in any other position). The secondary detent thus functions to retain the mirror head in the drive position. In such a situation (where the mirror head is folded rearward to the folded position under power and then manually folded outward to the drive position), the normal detent between the housing and the output gear is not lined up, so the secondary detent functions to hold the mirror head at the drive position. When later then under power to fold the mirror head, the motor will rotate the housing and output gear together until the output gear detents align with the base detents and the output gear snaps into position, which disengages the secondary detent, whereby further operation of the actuator in either direction will function in the normal manner.

Figure 11A:
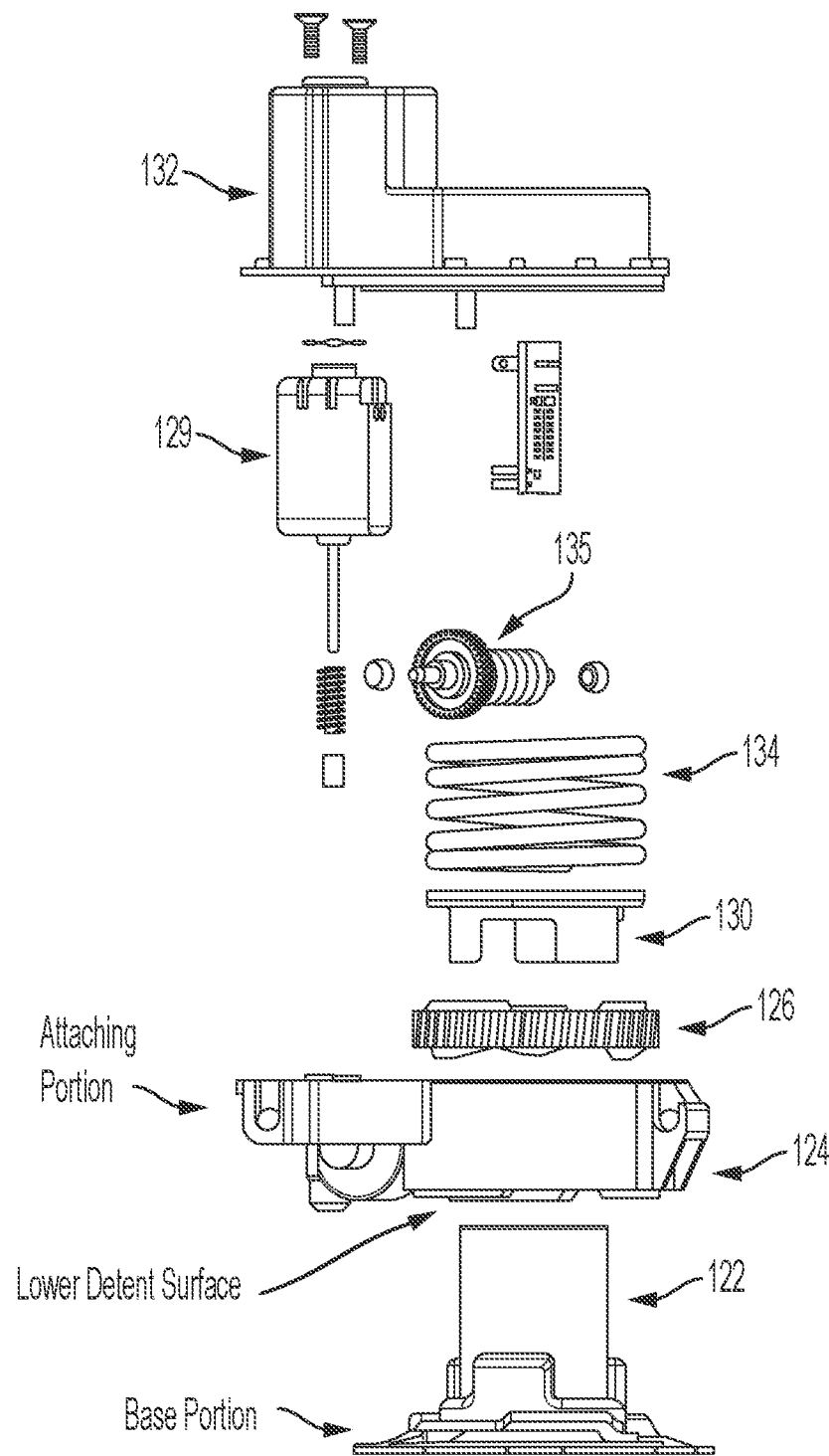
FIG. 11A is an exploded perspective view of an actuator with a base post.
Figure 11B:
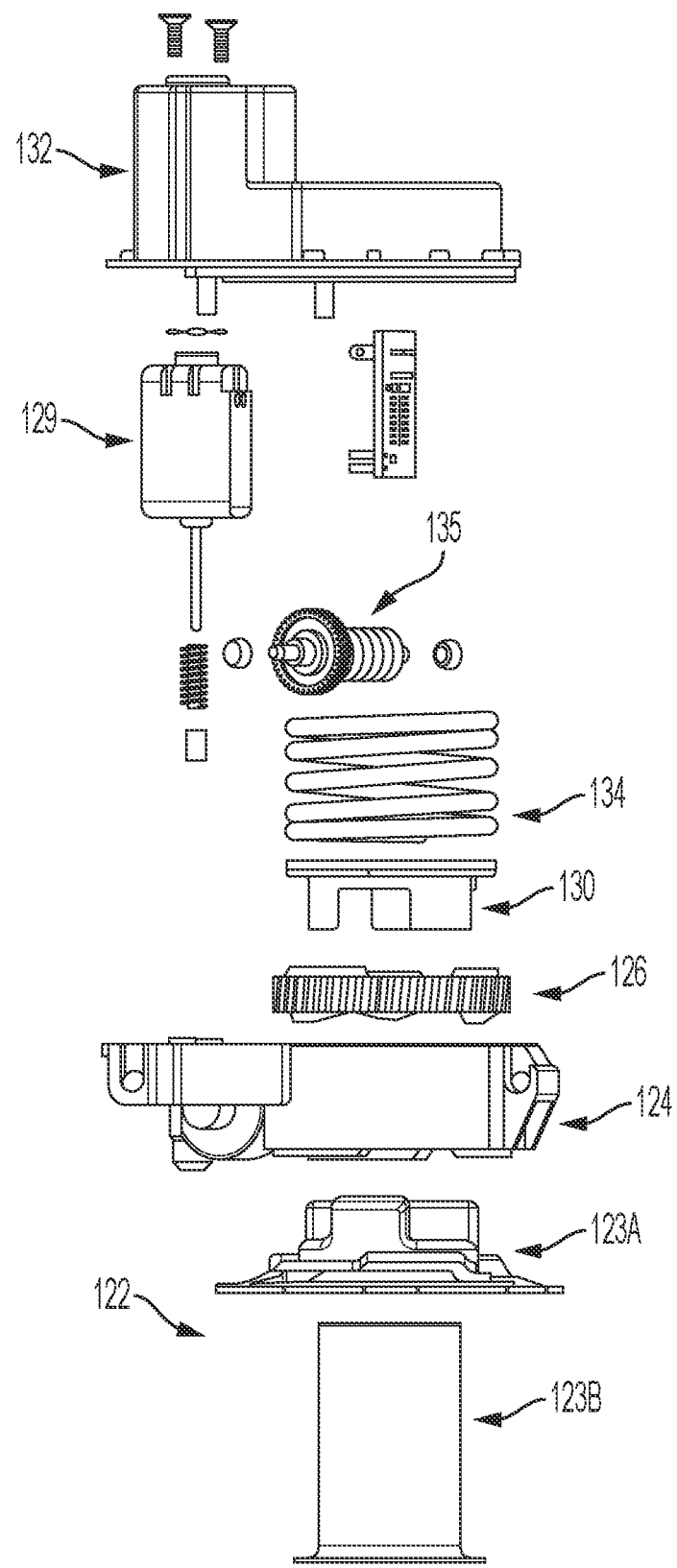
FIG. 11B is an exploded perspective view of an actuator with a base and a pivot tube.

Thus, the present invention provides a mirror powerfold actuator that has a secondary detent that only engages when the primary detent disengages. The secondary detent is thus a separate and distinct detent from the primary detent. Different springs or biasing elements (such as element 134, shown in FIG. 11A and FIG. 11B) or urging elements provide the forces to retain the respective detents in place.

Figure 10:
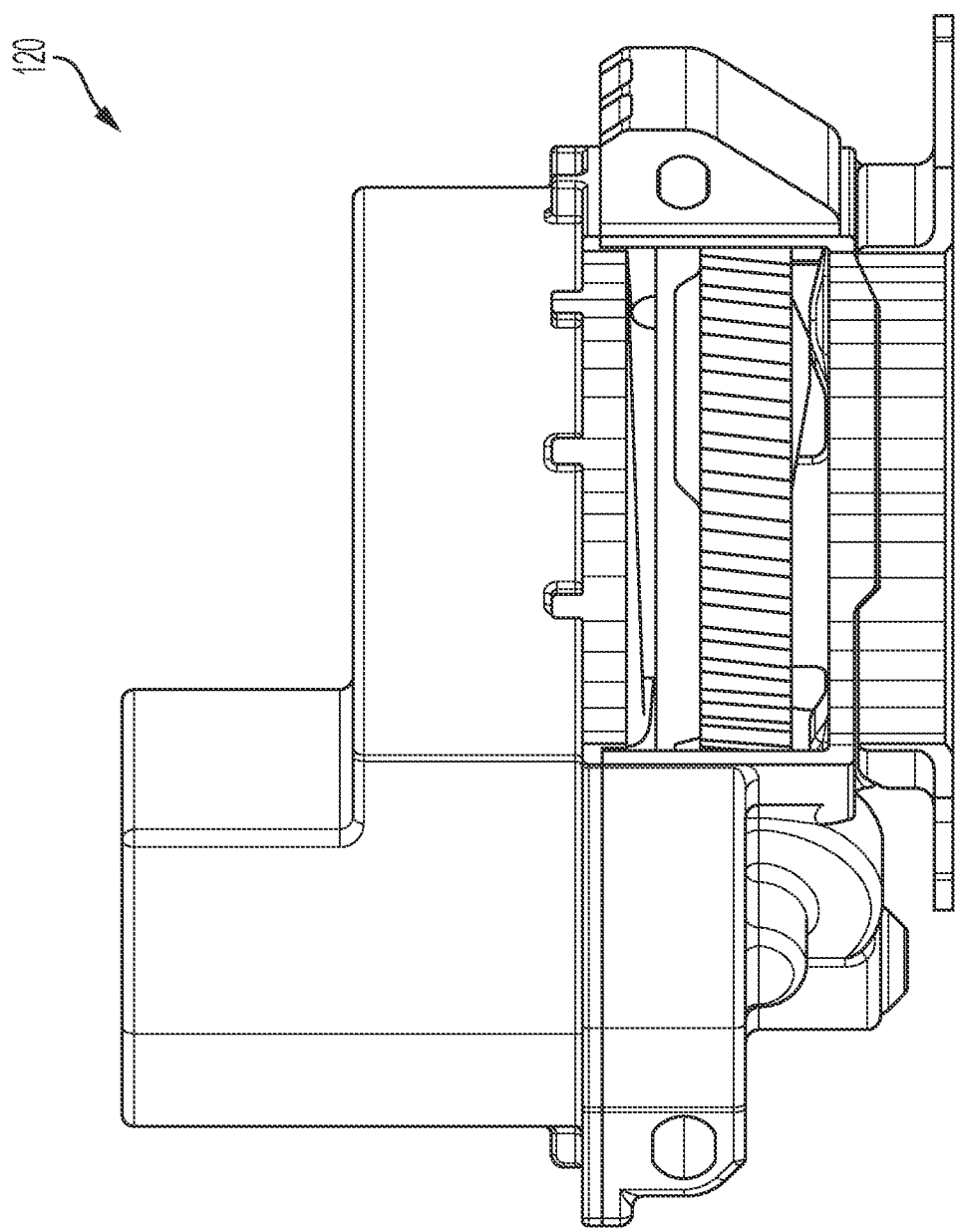
FIGS. 10-10B are perspective views of an actuator of an exterior rearview mirror assembly in accordance with the present invention.
Figure 10A:
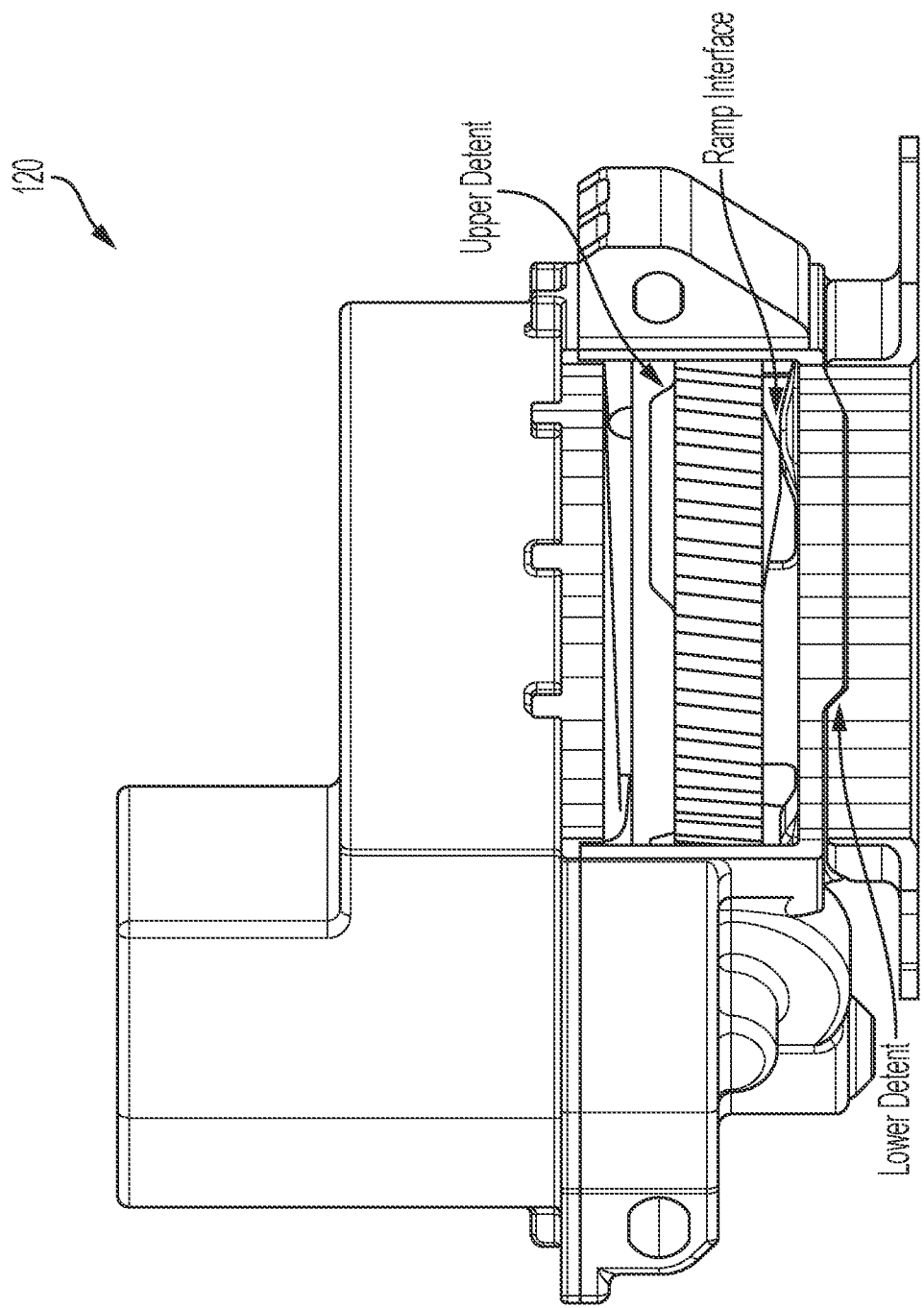
FIGS. 10C-10E are elevation views of the actuator of FIG. 10.
FIGS. 10F-10H are perspective views of the actuator of FIG. 10.
Figure 10B:
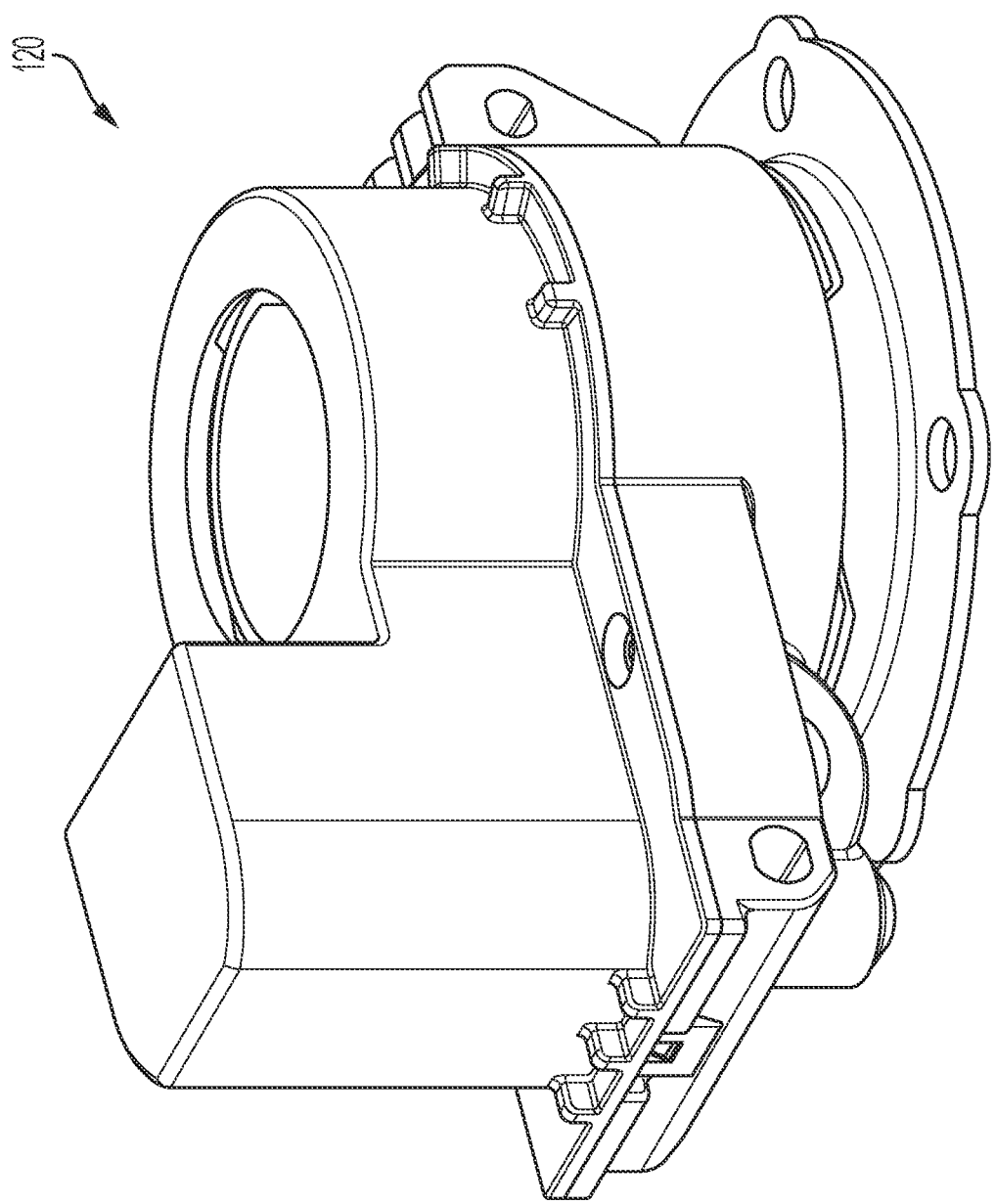
Figure 10C:
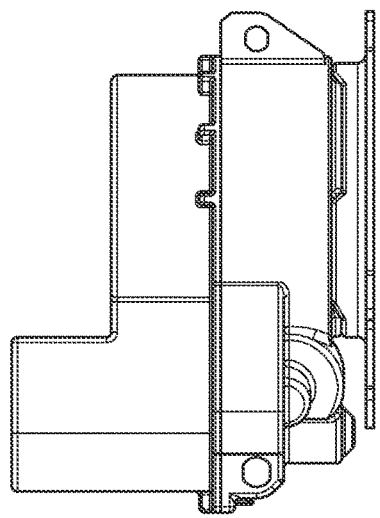
Figure 10D:
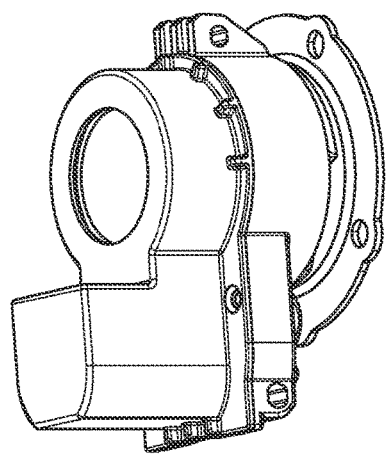
Figure 10E:
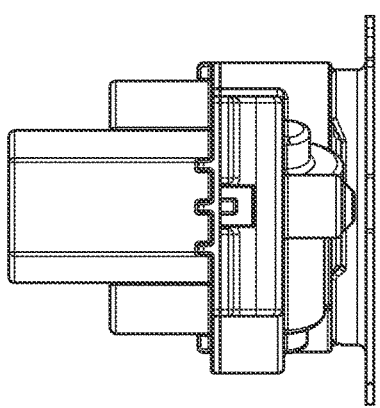
Figure 10F:
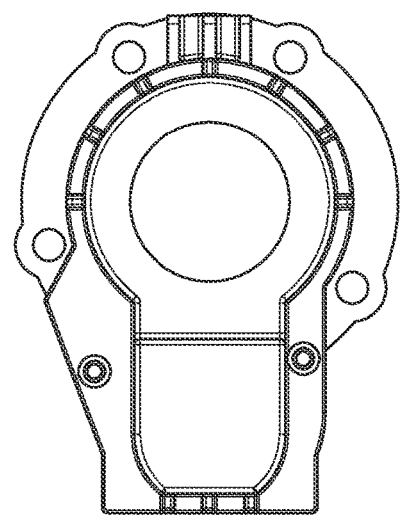
Figure 10G:
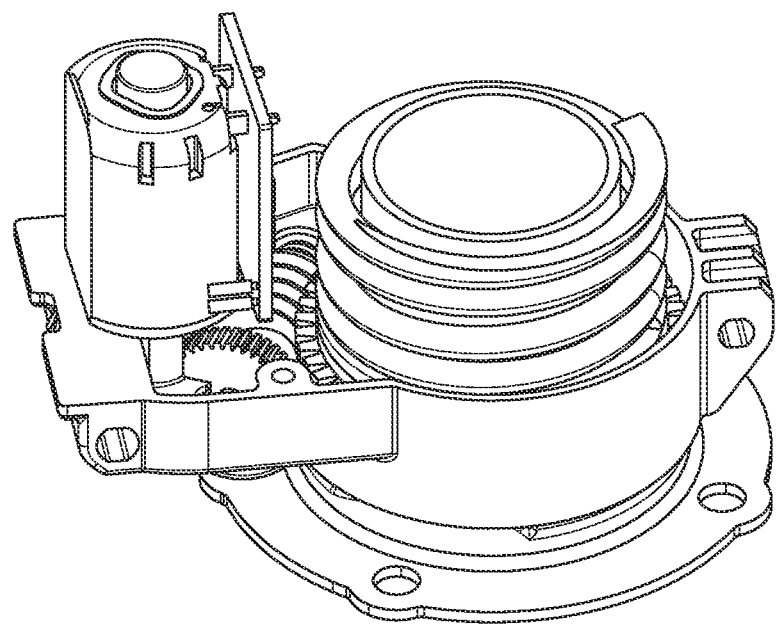
Figure 10H:
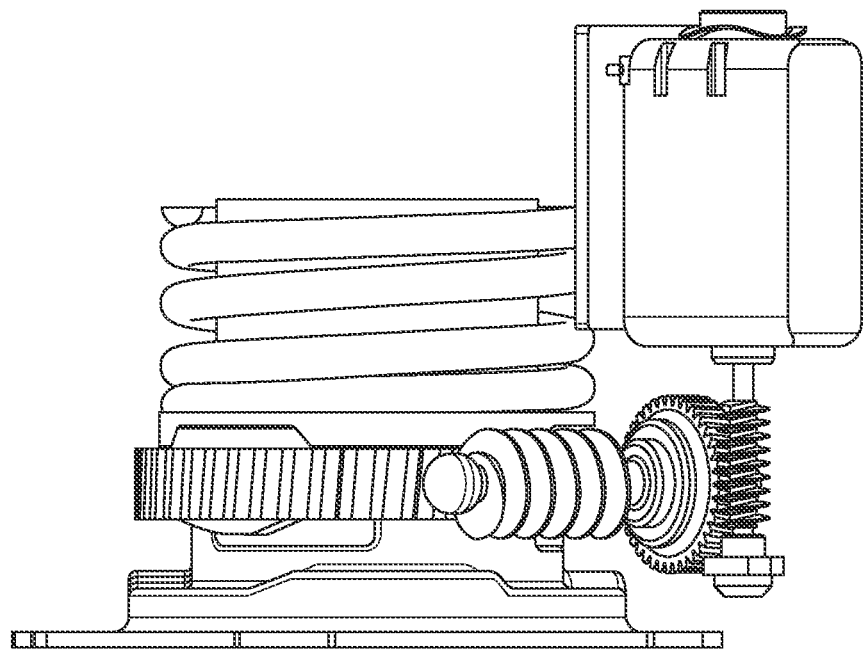

Optionally, the mirror assembly may have a different dual detent configuration to provide enhanced control and lifting of the mirror head during pivoting between the use or drive position and the park or folded position. For example, and with reference to FIGS. 10-10H, the mirror assembly may provide a powerfold actuator 120 with enhanced performance and capability (reduced noise, higher torque, lift and turn, double detent, and a larger pivot tube hole), having two detent interfaces that become active at different times between primary and secondary detent states. As shown in FIG. 10, these interfaces are referred to as an upper detent interface and a lower detent interface. The upper detent interface is between the output gear 126 and the upper detent part 130. The lower detent interface is between the lower housing 124 and the base 122. The third interface of importance is referred to as the ramp interface, which is between the output gear 126 and the lower housing 124.

Figure 11C:
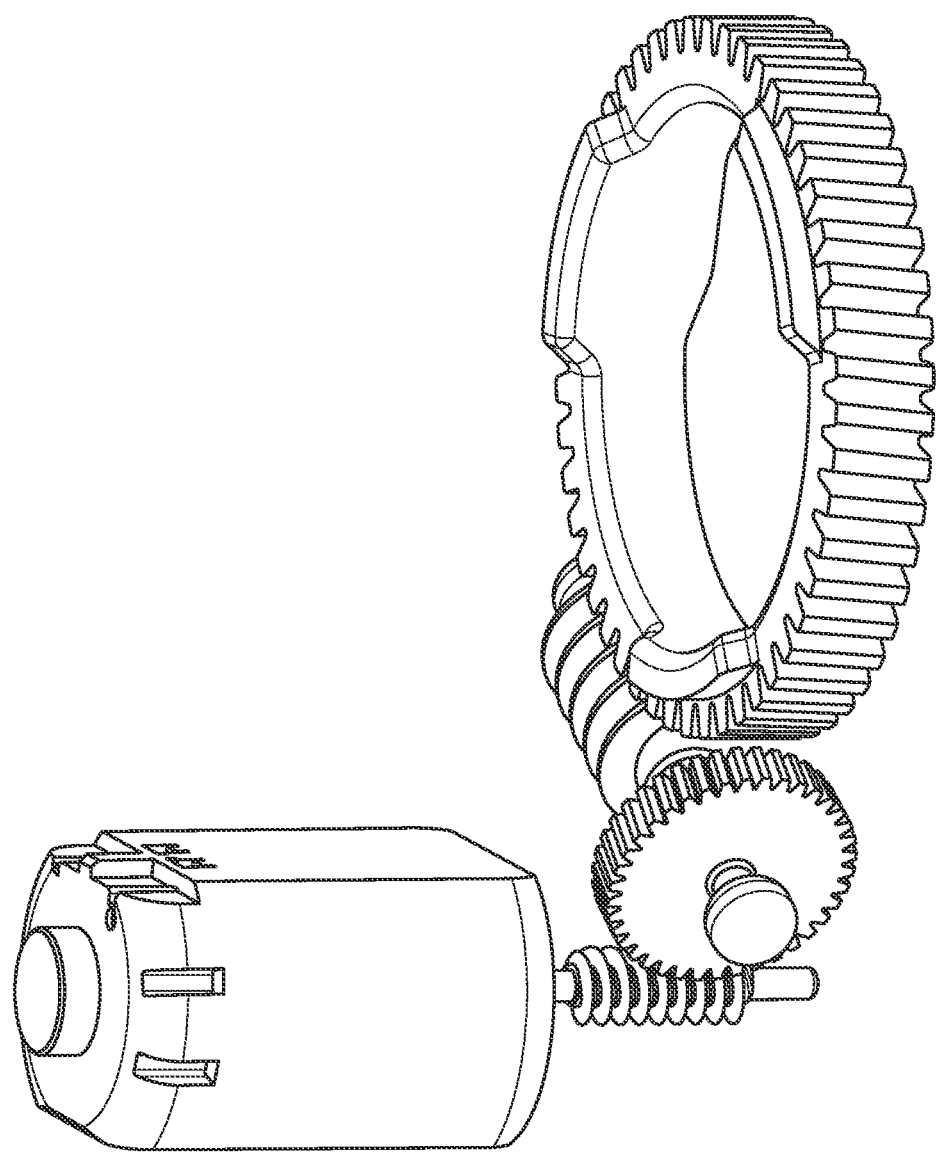
FIG. 11C is a perspective view of a gear train of the actuator of FIG. 10.

The mirror actuator 120 comprises a pivot assembly that has a base post 122 that has the pivot tube and base integrated together (FIG. 11A) or a separate base 123A and pivot tube 123B (FIG. 11B) that are assembled together to provide the base and post structure. Optionally, the pivot tube may be assembled with the flange at the top of the actuator assembly. This configuration will allow easier assembly by compressing the spring with the pivot tube before riveting/swedging below the base. The base post 122 provides or defines a pivot axis for the mirror head. A lower housing 124 and output gear 126 are disposed at the bottom of the base post 122 and are disposed at the mounting base 18. The lower housing 124 is rotatably disposed at the base post 122 and partially houses a motor 129. The base post 122 extends through the lower housing 124, output gear 126 and upper detent 130 and has an upper housing 132 that encloses the base post 122 at its upper end. The upper detent 130 is non-rotatably keyed with the base post 122 such that the upper detent 130 is fixed relative to the base post 122. The upper housing 132, along with lower housing 124, houses motor 129 (see FIG. 11C).

Figure 12B:
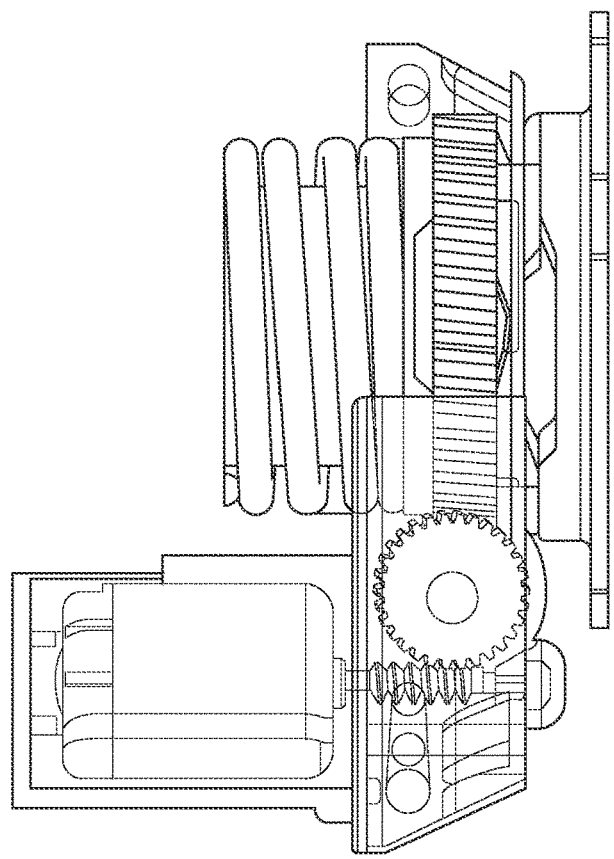
FIGS. 12A and 12B are perspective views of the actuator transitioning from the primary drive position/primary detent engagement to the park position.
Figure 12A:
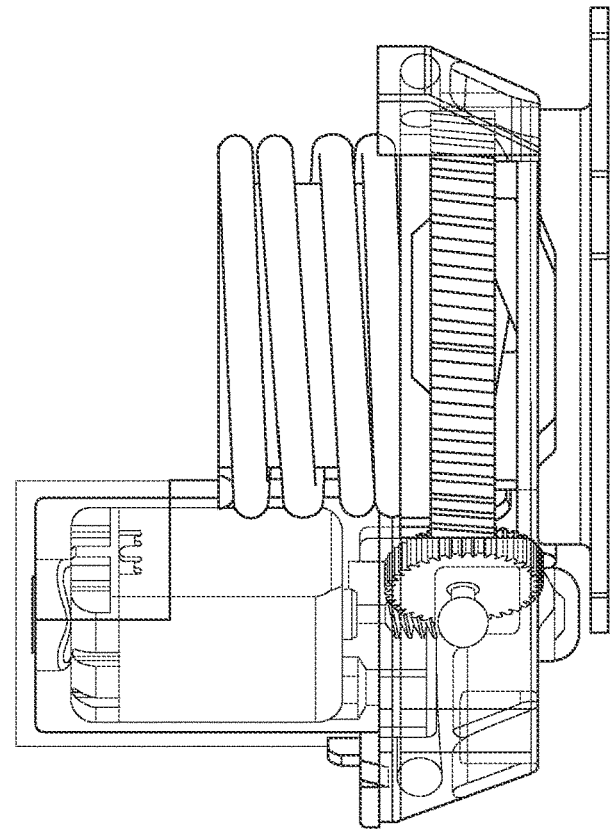
Figure 13A:
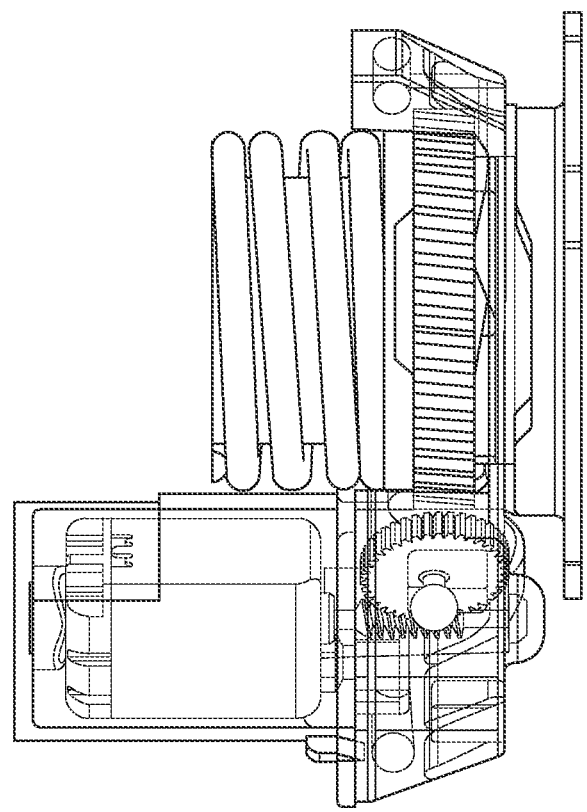
FIGS. 13A and 13B are perspective views of an actuator transitioning from the park position to the primary drive position.
Figure 13B:
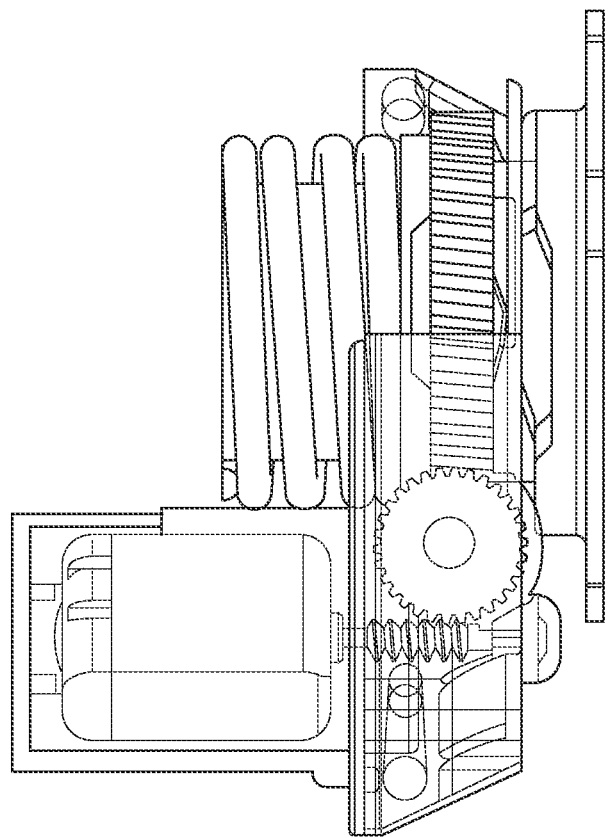
Figure 14A:
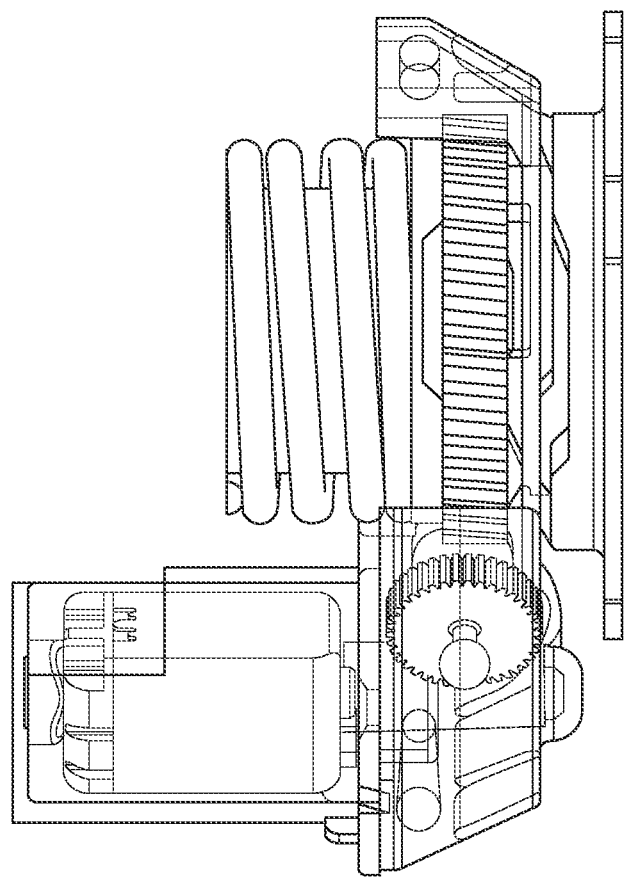
FIGS. 14A and 14B are perspective views of an actuator transitioning from the park position to the secondary drive position/secondary detent engagement.
Figure 14B:
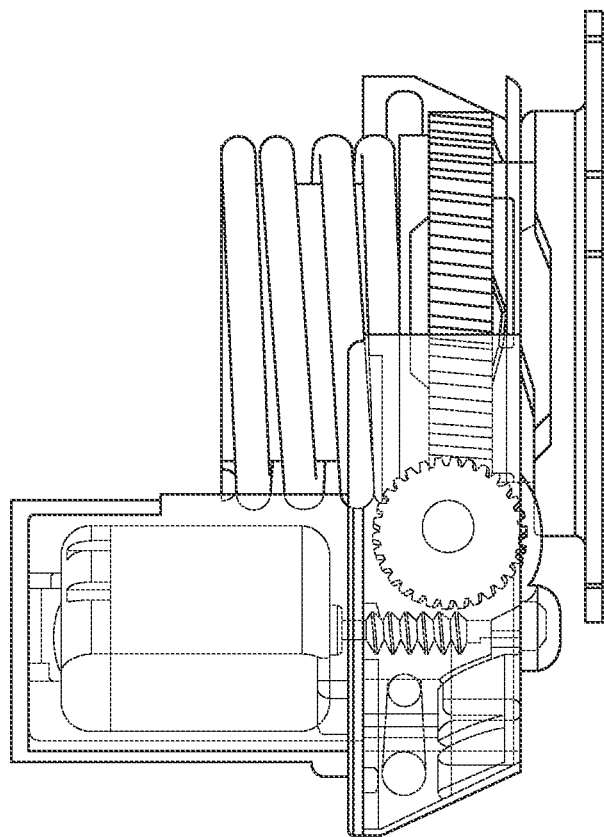

The pivot assembly provides detents to retain the mirror head at the use position or at the folded position. FIGS. 12A and 12B show the lower housing 124 riding up the lower detent ramps on the base 122 to provide about 1.5 mm of mirror head lift when the actuator is electrically powered and the motor 129 rotates about the output gear 126 via main gear 135. The actuator begins in the primary drive position (FIG. 12A) and the lower housing 124 rotates with respect to the base 122 and output gear 126 to achieve the park position (FIG. 12B). The lower detent ramps are designed to allow constant surface contact between the lower housing 124 and the base 122 while in contact. There is no spring load on the lower housing as it climbs the ramps under normal electric folding conditions. This is due to the lower end of the upper detent part 130 bottoming out on the base 122, which alters the path of the spring load directly to the base post 122. FIGS. 13A and 13B show the actuator 120 returning to the primary drive position from the park position. The actuator 120 begins in the park position (FIG. 13A) and, when powered to pivot the mirror head toward the drive position, the actuator 120 finds the primary drive position by riding back down the lower detent ramps on the base post 122 and becoming cinched between the upper detent 130 and lower detent of the base post 122 (FIG. 13B). FIGS. 14A and 14B show the actuator 120 moving from the park position to the secondary detent drive position (via manual folding of the mirror head). The actuator 120 begins in the park position (FIG. 14A) and, when the mirror head is manually pivoted toward the drive position, the lower housing 124 rotates with the output gear 126 with respect to the base 122 and upper detent 130. The output gear 126 climbs the ramps of the upper detent 130, pushing the upper detent 130 away from the base 122.

The secondary detent assembly or device 136 functions when the mirror is electrically folded into the park position and then manually folded back to the drive position (see FIGS. 14A and 14B). While both the upper and lower detents are active in the primary detent function (during powerfolding of the mirror head), only the lower detent interface is active in the secondary detent function (when manually folding the mirror head). To return to the primary detent, the output gear 126 must be driven until it finds the upper detent interface. While the output gear 126 is searching for the upper detent 130 it climbs the ramps located on the ramp interface.

Figures 15A, 15B:
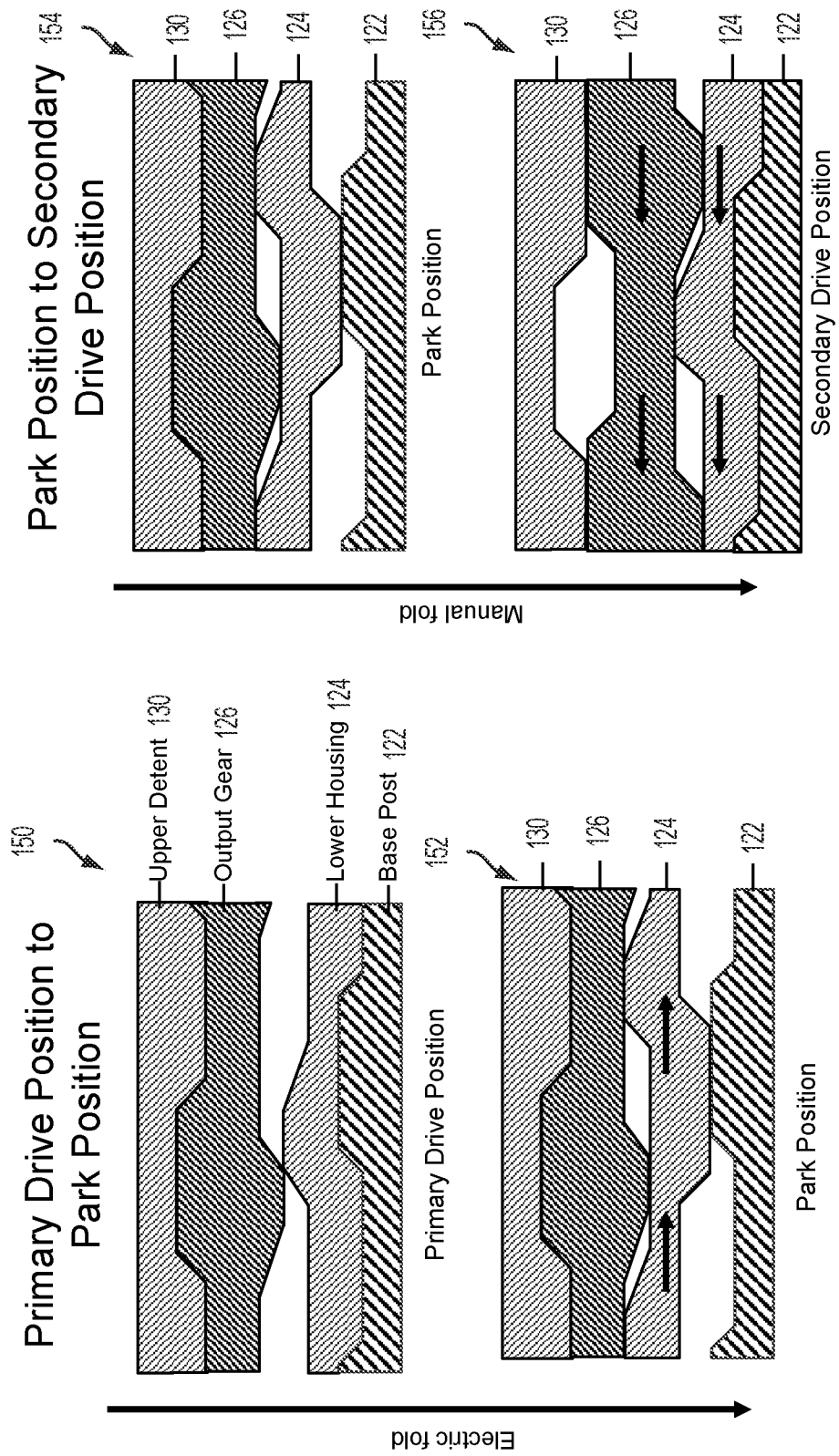
FIG. 15A is a sectional view of the primary detent when the actuator rotates from a primary drive position to a park position.
FIG. 15B is a sectional view of the secondary detent when the mirror head is manually folded from the park position to a secondary drive position.

As illustrated in FIG. 15A, the primary detent transitions from a primary drive position to a park position during an electric powerfold event. As shown in schematic 150, the upper detent 130 and output gear 126 remain in a fixed position in relation to the base post 122 as the motor 129 rotates the lower housing 124 about the drive gear. As the lower housing 124 rotates in schematic 152, the housing climbs the ramps located on the base post 122. When returning to the drive position from the park position via electric folding, the motor 129 rotates the housing 124 in the opposite direction until the lower housing 124 descends back down the ramps located on the base post 122 (FIG. 12B). As illustrated in FIG. 15B, a secondary detent is achieved when the mirror head is manually folded from the park position (schematic 154) to the drive position (schematic 156). The lower housing 124 and the output gear 126 rotate together (as the mirror head is manually pivoted) and as the output gear 126 climbs the ramp located on the upper detent 130, the upper detent is displaced away from the output gear 126 while the lower housing 124 searches for the detent in the base post 122 to achieve the secondary drive/detent position.

Figure 16:
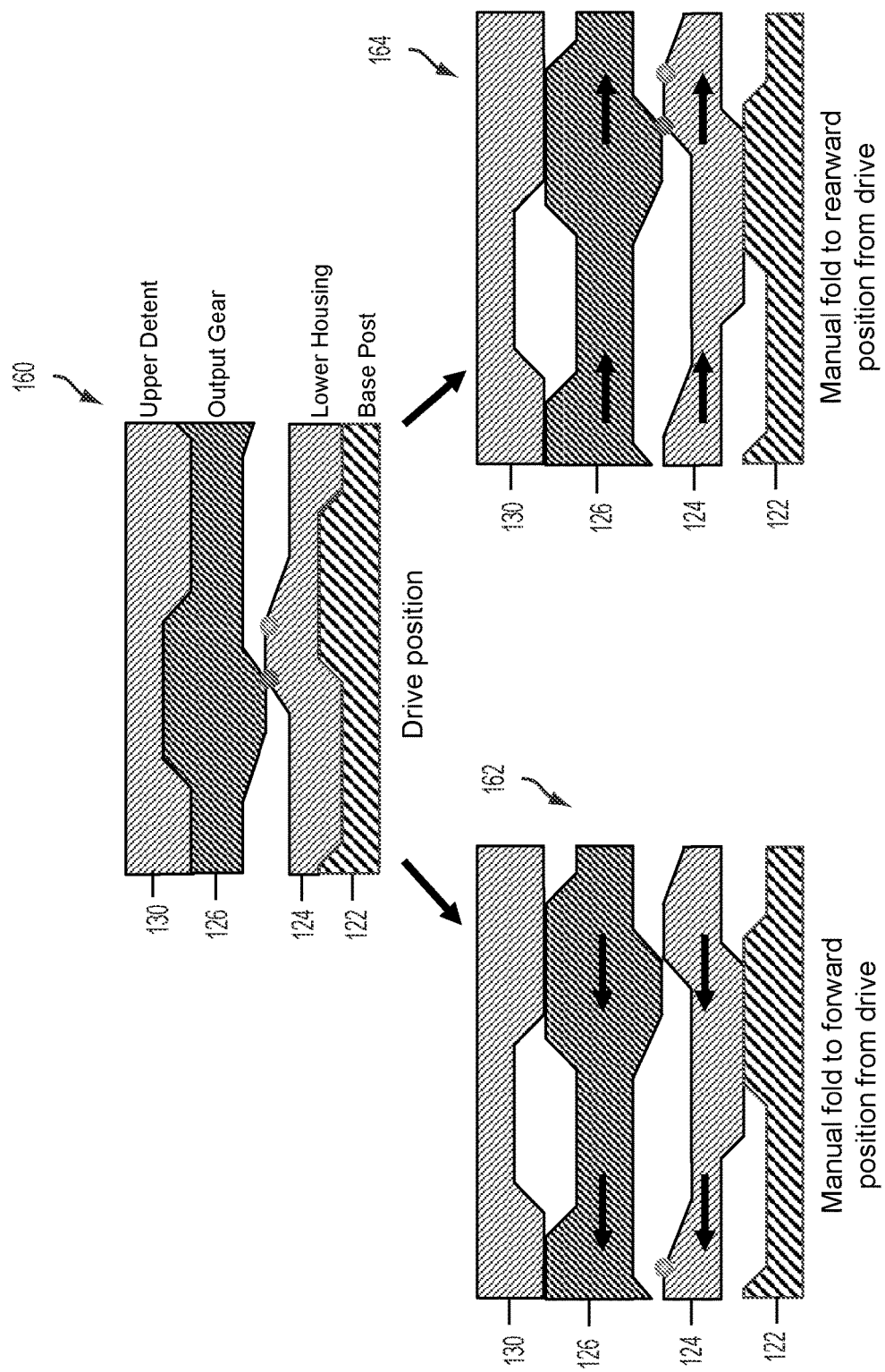
FIG. 16 is a sectional view of the secondary detent when the mirror head is manually folded from the primary drive position into a forward position or a rearward position.
Figure 17:
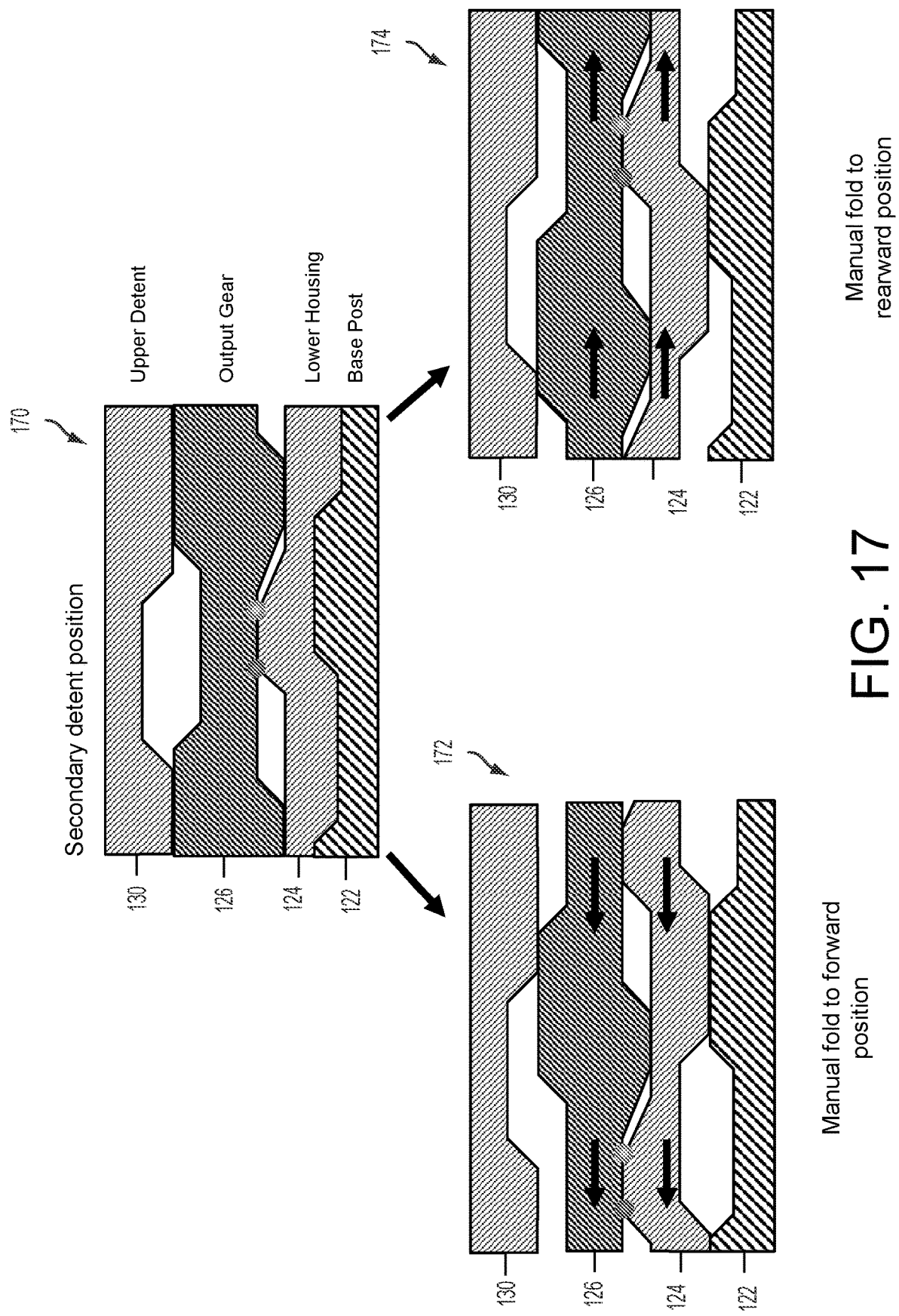
FIG. 17 is a sectional view of the secondary detent when the mirror head is manually folded from the secondary drive position into a forward position or a rearward position.

Referring now to FIG. 16, the mirror head may be manually folded forward (schematic 162) from the primary drive position (schematic 160) or manually folded rearward (schematic 164) from the primary drive position. In both directions, the lower housing 124 and output gear 126 rotate together to climb/descend ramps located at the upper detent 130 and base post 122. As shown in FIG. 17, the mirror head may also be folded to the forward position (schematic 172) and to the rearward position (schematic 174) from the secondary drive/detent position (schematic 170).

Figure 18A:
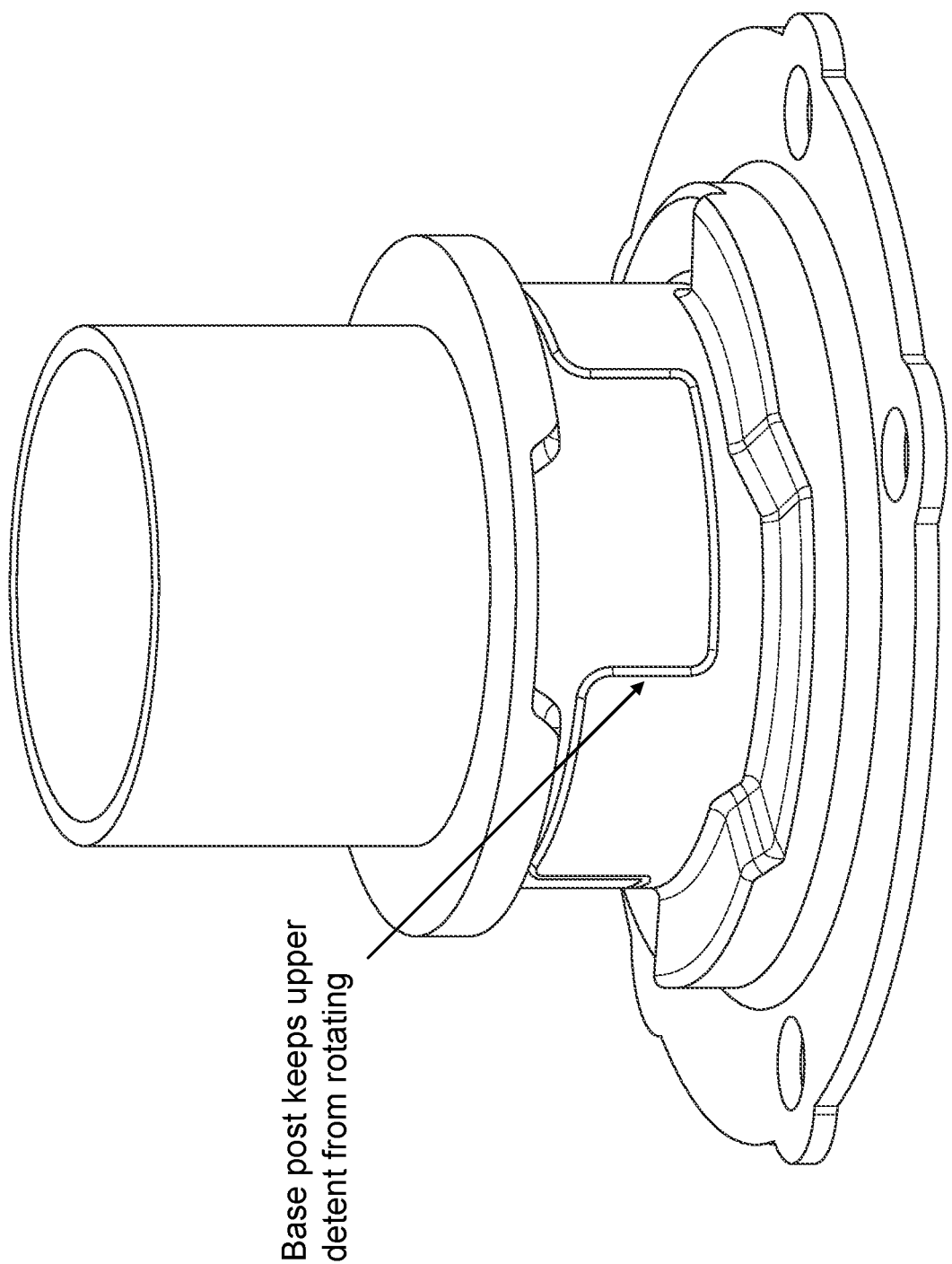
FIGS. 18A and 18B are perspective views of a base post of the actuator.
Figure 18B:
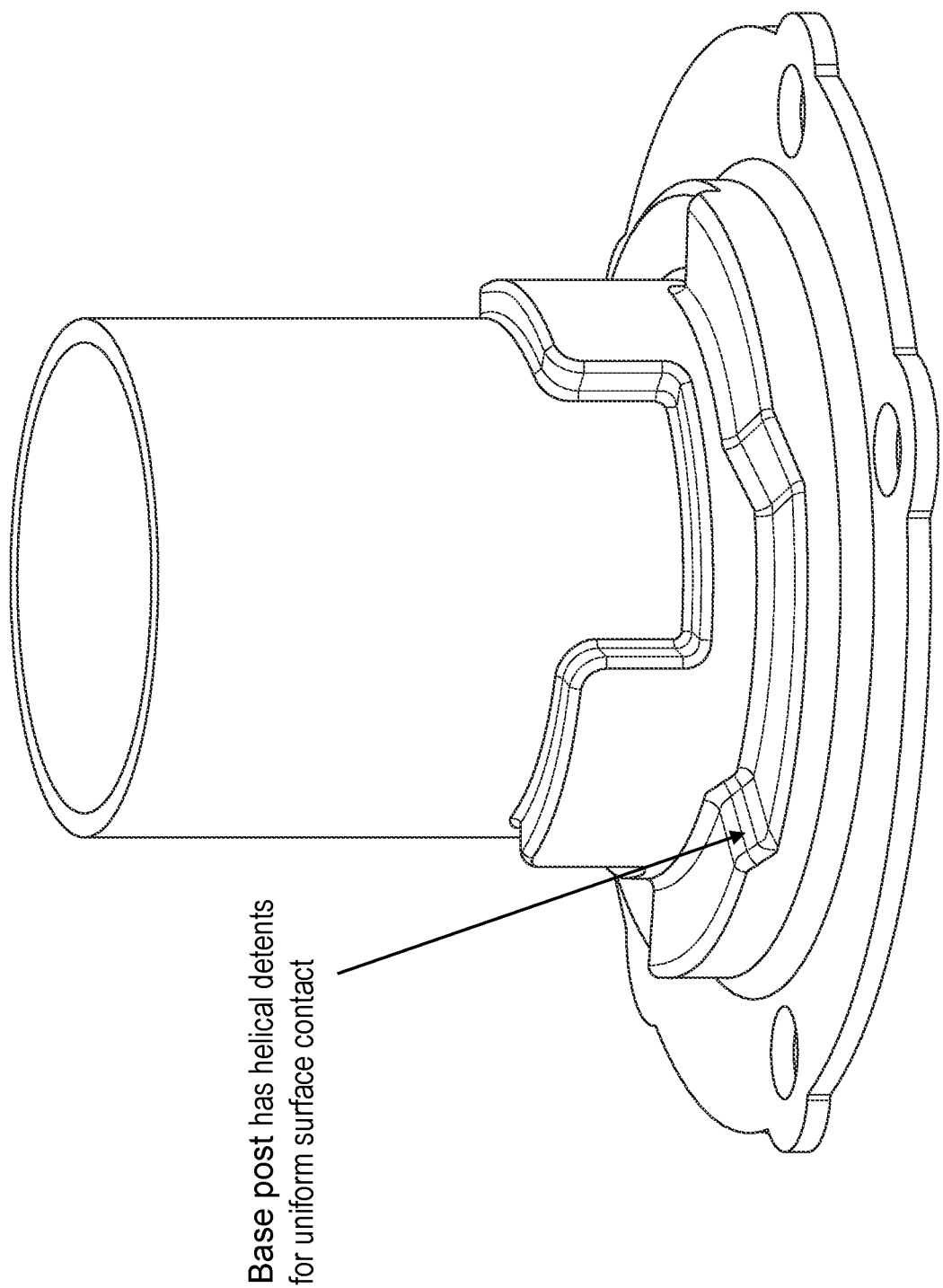
Figure 19B:
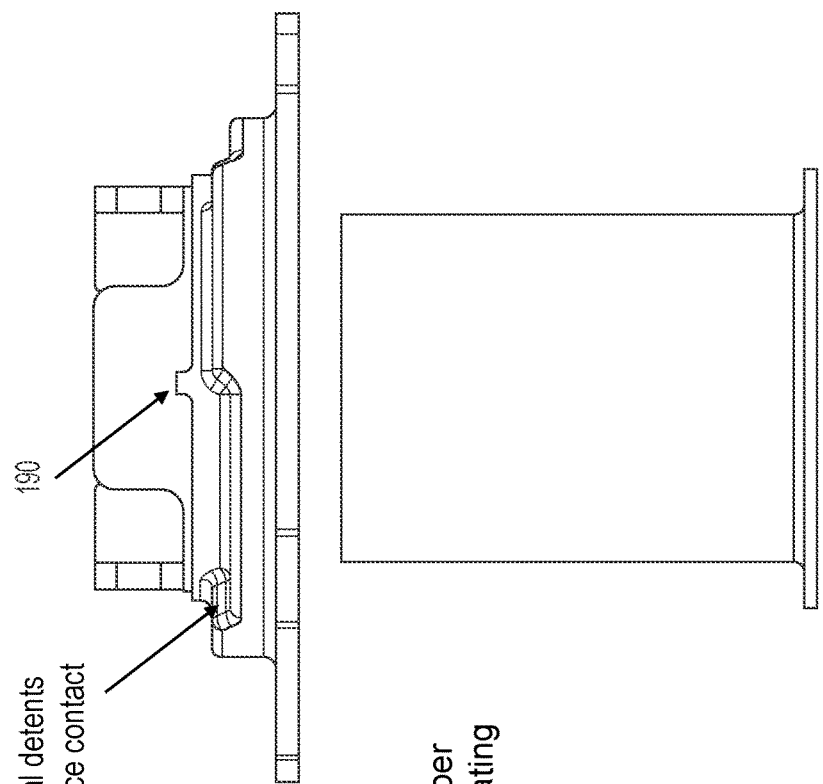
FIGS. 19A and 19B are perspective views of a base and pivot tube of the actuator.
Figure 19A:
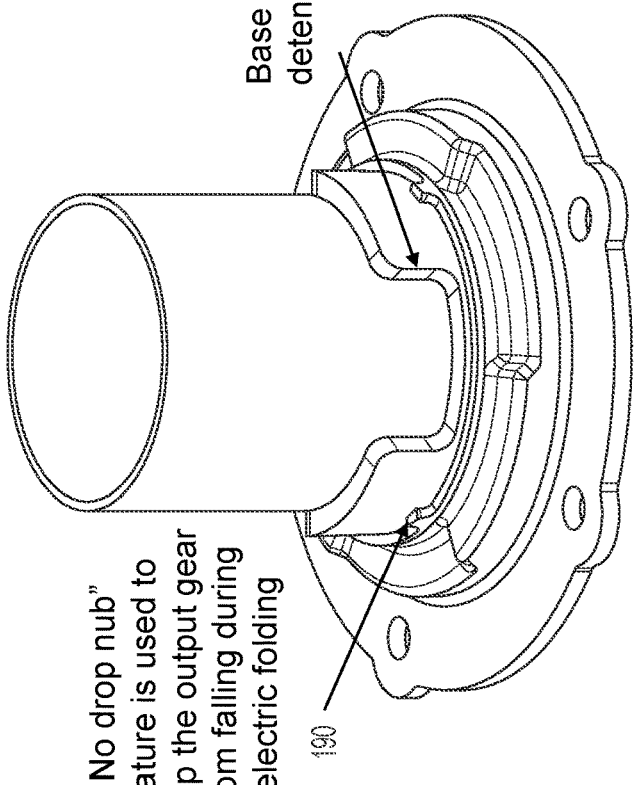

Optionally, and such as shown in FIGS. 18A and 18B, the base post 122 may be notched or keyed to fix the upper detent 130 in place in relation to the base post 122 (FIG. 18A). The base post 122 has helical detents (lower detents) to achieve uniform surface contact with the lower housing 124 (FIG. 18B). Referring now to FIGS. 19A and 19B, the separate base 123A has a "no drop nub" feature 190 to keep the output gear 126 from falling during electric folding (FIG. 19A). The base 123A also has helical detents that keep the upper detent 130 from rotating and maintains uniform surface contact with the upper detent (FIG. 19B).

Thus, the present invention provides a mirror powerfold actuator that has a secondary detent that only engages when the primary detent disengages. The secondary detent is thus a separate and distinct detent from the primary detent. A single spring or biasing element or urging element provides the forces to retain the respective detents in place.

During powerfold operation, the primary detents function to retain the mirror head in either the use/drive position or the park position, and during manual pivoting of the mirror head (forward or rearward relative to the use/drive position), the secondary detents function to retain the mirror head in either the use/drive position, the park position, or a forward pivoted position. When the secondary detents retain the mirror head, subsequent powerfolding of the mirror head will cause the mirror head to be retained by the primary detents.

The present invention also provides relief at the cut line seal during pivoting of the mirror head. The upper ramp detent is loaded by the coil spring and provides pressure at the housing, which is held and urged against the output gear. When in the drive position, the housing is at a lower position and the cut line seal is compressed between the mirror head mounting portion and the mounting base. The housing, when rotated toward the folded position, lifts relative to the output gear and mounting base to increase the gap and release pressure at the cut line seal. The mirror head thus lifts slightly to release pressure at the seal, so there are reduced forces at the seal during pivotal movement of mirror head. The actuator of the present invention also allows for such lifting of the housing and the mirror head without compressing the coil spring so that less work is required from the motor. This is done via the aligned ramped surfaces so the housing moves up the ramp of the output gear while correspondingly moving up the ramp of the upper detent.

Changes and modifications in the specifically described embodiments may be carried out without departing from the principles of the present invention, which is intended to be limited only by the scope of the appended claims as interpreted according to the principles of patent law.

The invention claimed is:

1. A vehicular exterior rearview mirror assembly, said vehicular exterior rearview mirror assembly comprising:

a mirror head movably attached at a mounting base configured for mounting at a side of a vehicle equipped with said vehicular exterior rearview mirror assembly, wherein said mirror head comprises a mirror casing and a mirror reflective element;

an actuator electrically operable to move said mirror head relative to said mounting base, wherein, with said mounting base mounted at the side of the vehicle, said actuator, when electrically operated, moves said mirror head between at least an extended position, where the mirror head is extended outward from the side of the vehicle so that the mirror reflective element is positioned to provide a rearward view at the side of the vehicle to a driver of the vehicle, and a folded position, where the mirror head is moved inward from the extended position toward the side of the vehicle;

wherein said actuator comprises (i) a base portion fixed relative to said mounting base, said base portion having an upper detent surface at a lower end region of said base portion and a post extending from the lower end region, (ii) an output gear having an upper detent surface and a lower detent surface, (iii) an attaching portion attached at said mirror head and having an upper detent surface and a lower detent surface, (iv) an upper detent element, and (v) a biasing element disposed between said upper detent element and an upper end of said post, the biasing element biasing said upper detent element away from the upper end of said post;

wherein said actuator comprises an electrically powered motor that is electrically operable to move said attaching portion relative to said base portion;

wherein, when said electrically powered motor is electrically powered to move said mirror head between the folded position and the extended position, said electrically powered motor moves relative to said base portion and the lower detent surface of said attaching portion moves relative to the upper detent surface of said base portion, and wherein, as the lower detent surface of said attaching portion moves relative to the upper detent surface of said base portion, said attaching portion moves axially away from said base portion to move said mirror head relative to said mounting base; and wherein, as the lower detent surface of said attaching portion moves relative to the upper detent surface of said base portion, the upper detent surface of said attaching portion moves relative to the lower detent surface of said output gear, such that said upper detent element is not axially moved relative to said base portion.

2. The vehicular exterior rearview mirror assembly of claim 1, wherein said attaching portion is disposed between said output gear and said upper detent element.

3. The vehicular exterior rearview mirror assembly of claim 2, wherein, while said actuator moves said mirror head between the folded position and the extended position, said lower detent surface of said attaching portion moves relative to said upper detent surface of said output gear.

4. The vehicular exterior rearview mirror assembly of claim 1, wherein, while said mirror head is manually moved, said lower detent surface of said output gear is disengaged from said upper detent surface of said base portion.

5. The vehicular exterior rearview mirror assembly of claim 1, wherein said attaching portion is disposed between said base portion and said output gear.

6. The vehicular exterior rearview mirror assembly of claim 5, wherein said upper detent element is non-rotatably disposed at said base portion, and wherein said upper detent element is axially movable relative to said post.

7. The vehicular exterior rearview mirror assembly of claim 1, wherein, during manual moving of said mirror head relative to said mounting base, said attaching portion and said output gear move together.

8. The vehicular exterior rearview mirror assembly of claim 1, wherein said actuator comprises a first detent interface that is engaged to maintain said mirror head at the folded position or at the extended position when said mirror head is moved via said actuator to the folded position or to the extended position, and wherein said actuator comprises a second detent interface that is engaged to maintain said mirror head at the folded position or at the extended position when said mirror head is manually moved to the folded position or to the extended position.

9. A vehicular exterior rearview mirror assembly, said vehicular exterior rearview mirror assembly comprising:
- a mirror head movably attached at a mounting base configured for mounting at a side of a vehicle equipped with said vehicular exterior rearview mirror assembly, wherein said mirror head comprises a mirror casing and a mirror reflective element;
- an actuator electrically operable to move said mirror head relative to said mounting base, wherein, with said mounting base mounted at the side of the vehicle, said actuator, when electrically operated, moves said mirror head between at least an extended position, where the mirror head is extended outward from the side of the vehicle so that the mirror reflective element is positioned to provide a rearward view at the side of the vehicle to a driver of the vehicle, and a folded position, where the mirror head is moved inward from the extended position toward the side of the vehicle;
- wherein said actuator comprises (i) a base portion fixed relative to said mounting base, said base portion having an upper detent surface at a lower end region of said base portion and a post extending from the lower end region, (ii) an output gear having an upper detent surface and a lower detent surface, (iii) an attaching portion attached at said mirror head and having an upper detent surface and a lower detent surface, (iv) an upper detent element, and (v) a biasing element disposed between said upper detent element and an upper end of said post, the biasing element biasing said upper detent element away from the upper end of said post;
- wherein said actuator comprises an electrically powered motor that is electrically operable to move said attaching portion relative to said base portion;
- wherein, when said electrically powered motor is electrically powered to move said mirror head between the folded position and the extended position, said electrically powered motor moves relative to said base portion and the lower detent surface of said attaching portion moves relative to the upper detent surface of said base portion, and wherein, as the lower detent surface of said attaching portion moves relative to the upper detent surface of said base portion, said attaching portion moves axially away from said base portion to move said mirror head relative to said mounting base; and
- wherein, as the lower detent surface of said attaching portion moves relative to the upper detent surface of said base portion, the upper detent surface of said attaching portion moves relative to the lower detent surface of said output gear, such that said attaching portion is axially moved away from said base portion and said output gear is not axially moved with said attaching portion.

10. The vehicular exterior rearview mirror assembly of claim 9, wherein said attaching portion is disposed between said output gear and said upper detent element.

11. The vehicular exterior rearview mirror assembly of claim 10, wherein, while said actuator moves said mirror head between the folded position and the extended position, said lower detent surface of said attaching portion moves relative to said upper detent surface of said output gear.

12. The vehicular exterior rearview mirror assembly of claim 9, wherein, while said mirror head is manually moved, said lower detent surface of said output gear is disengaged from said upper detent surface of said base portion.

13. The vehicular exterior rearview mirror assembly of claim 9, wherein said attaching portion is disposed between said base portion and said output gear.

14. The vehicular exterior rearview mirror assembly of claim 13, wherein said upper detent element is non-rotatably disposed at said base portion, and wherein said upper detent element is axially movable relative to said post.

15. The vehicular exterior rearview mirror assembly of claim 9, wherein, during manual moving of said mirror head relative to said mounting base, said attaching portion and said output gear move together.

16. The vehicular exterior rearview mirror assembly of claim 9, wherein said actuator comprises a first detent interface that is engaged to maintain said mirror head at the folded position or at the extended position when said mirror head is moved via said actuator to the folded position or to the extended position, and wherein said actuator comprises a second detent interface that is engaged to maintain said mirror head at the folded position or at the extended position when said mirror head is manually moved to the folded position or to the extended position.

* * * * *